United States Patent [19]

Schabes et al.

[11] Patent Number: 5,475,588
[45] Date of Patent: Dec. 12, 1995

[54] SYSTEM FOR DECREASING THE TIME REQUIRED TO PARSE A SENTENCE

[75] Inventors: Yves Schabes, Luxembourg, Luxembourg; Richard C. Waters, Concord, Mass.

[73] Assignee: Mitsubishi Electric Research Laboratories, Inc., Cambridge, Mass.

[21] Appl. No.: 79,633

[22] Filed: Jun. 18, 1993

[51] Int. Cl.$^6$ .................................................. G06F 17/27
[52] U.S. Cl. ........................................................ 364/419.08
[58] Field of Search ............... 364/419.08, 419.01; 395/12, 700, 800, 600, 650, 200, 375

[56] References Cited

U.S. PATENT DOCUMENTS

| | | | |
|---|---|---|---|
| 4,667,290 | 5/1987 | Goss et al. | 395/700 |
| 4,688,195 | 8/1987 | Thompson et al. | 395/12 |
| 4,829,423 | 5/1989 | Tennant et al. | 364/419.08 |
| 4,887,212 | 12/1989 | Zamora et al. | 364/419.08 |
| 5,083,268 | 1/1992 | Hemphill et al. | 395/12 |
| 5,095,432 | 3/1992 | Reed | 364/419.08 |
| 5,111,398 | 5/1992 | Nunberg et al. | 364/419.08 |

OTHER PUBLICATIONS

Seki, et al.: "On mutiple context–free grammors", *Theoretical Computer Science*, vol. 88, No. 2, Oct. 7, 1991, pp. 191–229.

Yves Schabes: "Mathematical and Computational Aspects of Lexicalized Grammars", dissertation for PH.D. degree, University of Pennsylvania, 1990, abstract & pp. 1–12.

*Primary Examiner*—Robert A. Weinhardt
*Assistant Examiner*—Joseph Thomas
*Attorney, Agent, or Firm*—Robert K. Tendler

[57] ABSTRACT

A system is provided for dramatically decreasing the time required to parse a sentence by automatically converting a context-free grammar into a lexicalized form called lexicalized context-free grammar (LCFG) which is used in the parsing process. Lexicalized context-free grammar employs adjoining but, to decrease parsing time, only allows non-wrapping adjoining. The lexicalized context-free grammar is parsed using a parser that decreases parsing time by filtering the grammar based on the words in a sentence and maintaining the valid prefix property while parsing.

7 Claims, 12 Drawing Sheets

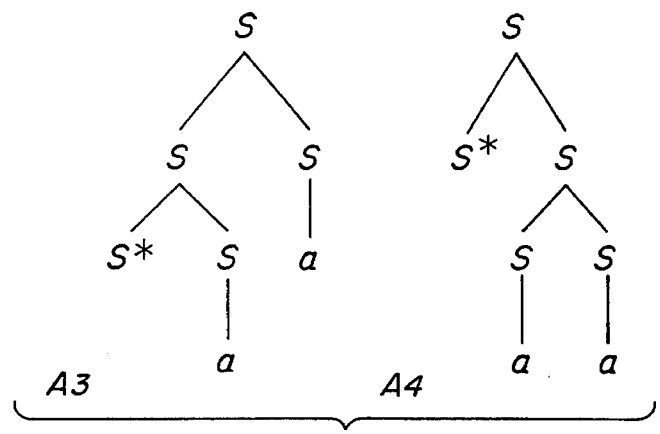
FIG. 13
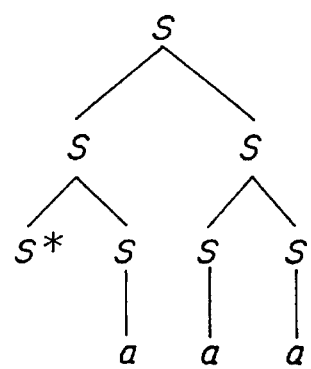
FIG. 14
S → A A
S → B A
A → B B
B → A S
B → b
FIG. 15
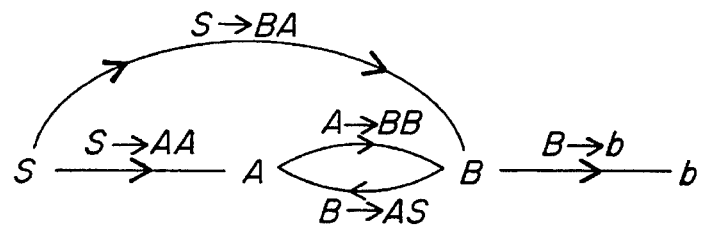
FIG. 16

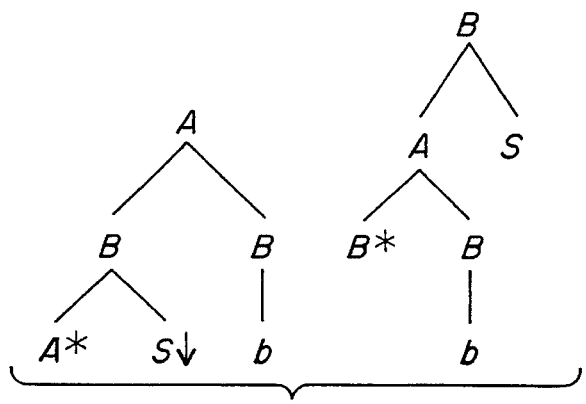
FIG. 22
$S \rightarrow AA$
$S \rightarrow BA$
$A \rightarrow BB$
$B \rightarrow ASa$
$B \rightarrow b$
FIG. 23
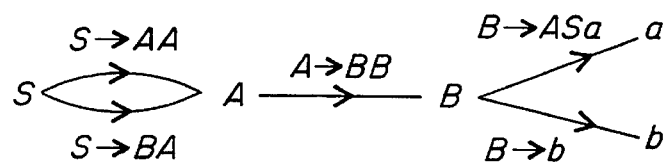
FIG. 24
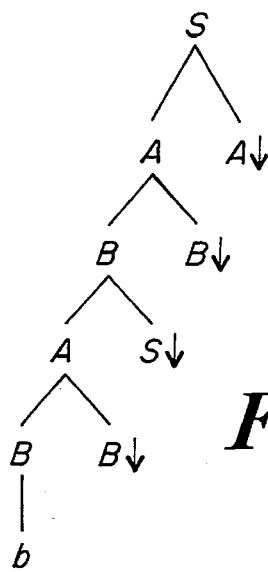
FIG. 25

SYSTEM FOR DECREASING THE TIME REQUIRED TO PARSE A SENTENCE

FIELD OF THE INVENTION

This invention relates to parsing of sentences and more particularly to systems that decrease parsing time by means of employing lexicalized grammars.

BACKGROUND OF THE INVENTION

For a computer to correctly interpret sentences in a natural human language, e.g., English, French, or Japanese, it must determine how the words in the sentences interact. This is done by representing the way sentences are constructed in the language as a set of grammar rules and using a parser that utilizes the grammar rules to derive a so-called parse tree that specifies the syntactic interaction between the words in a sentence. Once the interaction between the words in a sentence is known, the precise meaning of the sentence can be ascertained.

A grammar for a human language contains thousands and thousands of rules; however, only a handful of rules is applicable to any one sentence. To analyze a sentence, a parser has to compare each rule in the grammar with the sentence in order to determine which rules are applicable to the sentence and exactly where in the sentence each rule applies. The result of this analysis is represented as a parse tree, which shows what rules apply to each part of the sentence.

Due to the fact that grammars contain many rules and the fact that there are many places in a given sentence that a rule might apply, parsing is a time consuming process. In particular, current parsers are so slow that they place severe limits on the ability of computers to interpret human language.

Context-free grammars have been generally accepted for many years as the basis for parsing sentences in human languages. As discussed in standard textbooks on parsing, such as "Theory of Parsing, Translation and Compiling. Vol 1: Parsing", A. V. Aho and J. D. Ullman, Prentice-Hall 1973, the fastest context-free grammar parsers require a length of time $k*n^3$ where k is a large constant factor and $n^3$ is the cube of the number of words in the sentence being parsed.

It has been thought that parsing time can be dramatically decreased by converting a context-free grammar into a lexicalized form where every rule is directly linked to a word. The value of this is that a parser operating on a lexicalized grammar does not have to consider every rule in the grammar, but only the rules that are linked to the words in the actual sentence being parsed. This filtering of the grammar dramatically reduces the constant factor, k, and thus the time required to parse a sentence.

Heretofore, the most efficient lexicalized form for context-free grammar is lexicalized tree adjoining grammar. Unfortunately, as shown in "Tree-Adjoining Grammars and Lexicalized Grammars" by A. K. Joshi and Y. Schabes, in "Tree Automata and Languages", M. Nivat and A. Podeiski, editors, Elsevier, 1992, the fastest parsers for lexicalized tree adjoining grammar require a length of time $k*n^6$. Even though the constant factor, k, is reduced, the increase in the exponent means that for typical sentences, parsing using lexicalized tree adjoining grammar takes thousands of times longer than parsing with context-free grammar. As a result, far from decreasing parsing time, conversion to a lexicalized form has heretofore only increased parsing time.

More specifically, the rules in a grammar for a language specify how different types of words, e.g. nouns, verbs, and adjectives, are grouped into phrases, such as noun phrases and verb phrases; and how phrases are grouped into sentences. A rule in a context-free grammar specifies how one or more words or phrases can be grouped into a phrase or sentence. The process of using a grammar to determine how the words in a sentence have been combined, is called 'parsing'. A device that does parsing is called a 'parser'. The output created by a parser is called a 'parse tree'.

For example, consider the English sentence "The farmer loves the beach." Three key rules of English grammar are relevant to this sentence. First, a noun phrase can consist of a determiner, such as 'the' or 'a', followed by a noun, such as 'farmer' or 'house'. Second, a verb phrase can consist of a verb, such as 'loves' or 'buys', followed by a noun phrase. Third, a sentence can consist of a noun phrase followed by a verb phrase.

When given the above sentence and grammar rules, a parser creates a parse tree that specifies the structure of the sentence as follows: The sentence as a whole is composed of the noun phrase "the farmer" followed by the verb phrase "loves the beach". The noun phrase "the farmer" is composed of the determiner 'the' followed by the noun 'farmer'. The verb phrase "loves the beach" is composed of the verb 'loves' followed by the noun phrase "the beach". The noun phrase "the beach" is composed of the determiner "the" followed by the noun "beach".

A grammar is said to be lexicalized if every rule in the grammar contains a specific word. The above grammar is not lexicalized because the third rule does not refer to words, but just to general types of phrases. Lexicalized grammars speed parsing, because the parsing process need only consider the rules that contain the words that are actually in the sentence being parsed.

To convert a context-free grammar into a grammar that is lexicalized and yet leads to the same parse trees, one must use rules that are more complex than the rules used in context-free grammar. The best way to accomplish this to date is to use adjoining rules. By an adjoining rule is meant a rule that adds a word into the middle of a phrase. For example, in English a noun phrase, such as "the farmer", can be extended by adding an adjective, such as 'wise', before the noun, yielding "the wise farmer". This is a simple case of adjoining in which a word is added on only one side, here the left, of the subphrase. Rules of this type are called non-wrapping adjoining rules.

In more complex situations, adjoining can add words both before and after a subphrase. This is called wrapping adjoining, because the subphrase is 'wrapped' with added words on both sides. For example, there could be an adjoining rule that places words both before and after 'farmer' in the phrase above. A key observation is that wrapping adjoining rules add two words or groups of words that do not end up next to each other in the phrase, because the subphrase is in between. This is in contrast to context-free rules in which all the added words are always next to each other.

The key differences between lexicalized tree adjoining grammar and context-free grammar is that lexicalized tree adjoining grammar allows adjoining rules and requires every rule to contain a specific word. Because lexicalized tree adjoining grammars are lexicalized, they can be dynamically filtered during parsing by considering only those rules that contain the words that are in the sentence being parsed. This has the potential of reducing parsing time, because it reduces the constant factor k.

However, because it allows wrapping adjoining rules lexicalized tree adjoining grammar is much more time consuming to parse with than context-free grammar. Since the items combined by a context-free rule must be next to each other, a parser only has to consider items that are next to each other when considering whether a context-free rule applies. However, since a wrapping adjoining rule can add items that are not next to each other, a parser must consider pairs of items that are not next to each other when considering whether an adjunction rule applies. This adds a great many more situations that have to be considered, and the parser is forced to operate in time $k*n^6$. While k is reduced by using lexicalized tree adjoining grammar, the parsing time is dramatically increased, because the $n^3$ time factor of context-free grammars goes to $n^6$.

SUMMARY OF THE INVENTION

In order to gain the benefits of having a lexicalized grammar without incurring the time penalty of supporting wrapping adjunction rules, the subject system converts a context-free grammar into a lexicalized form called lexicalized context-free grammar, LCFG, that employs adjoining but only allows non-wrapping adjoining. The lexicalized context-free grammar permits a parser that only looks at adjacent groups of words. This is possible because only non-wrapping adjoining is allowed. The fact that the parser only looks at adjacent groups of words saves a great deal of parsing time and allows the parser to operate in time $k*n^3$. Because the grammar is lexicalized, the constant factor k can be an order of magnitude or more smaller than for a context-free grammar parser.

The subject lexicalized context-free grammar is a lexicalized tree adjoining grammar except that lexicalized context-free grammar only allows non-wrapping adjoining. More specifically, the lexicalized context-free grammar consists of two kinds of parse-tree fragments: initial trees and auxiliary trees. The initial trees are a generalized form of context-free grammar rules and are combined in the same way as context-free grammar rules. The auxiliary trees represent adjunction. They are combined, or adjoined, by inserting them into trees representing phrases. The auxiliary trees are required to be non-wrapping in nature; that is to say, they are required to insert a group of words either before or after a subphrase, but not both. This restriction is possible because wrapping adjoining is not required when creating a lexicalized grammar from a context-free grammar. Rules that insert words before a subphrase are called left adjunction rules. Rules that insert words after a subphrase are called right adjunction rules.

The subject system converts a context-free grammar into a lexicalized context-free grammar automatically as follows. Given a context-free grammar $G_1$, a so-called lexicalization graph is created that represents the way the rules in the grammar interact. The graph consists of nodes linked by arrows referred to as arcs. The arcs correspond to rules in the grammar $G_1$. If two arcs are chained together in the graph, this means that the corresponding grammar rules can be applied one after the other.

A path in a graph is a connected chain of arcs going from node to node. In the case of the lexicalization graph, this corresponds to a possible sequence of applications of rules. There are two kinds of paths in the graph: acyclic paths and cyclic paths. By acyclic path is meant a path that does not pass through any node twice. By cyclic path is meant a path that passes through some node twice. By minimal cyclic path is meant a cyclic path with the property that if any one arc is removed from the path, the path is no longer cyclic.

A lexicalized context-free grammar $G_2$ corresponding to $G_1$ is generated by creating initial trees corresponding to acyclic paths, and auxiliary trees corresponding to minimal cyclic paths. The tree corresponding to a path is created by fusing together into one composite rule the rules corresponding to the arcs in the path.

The restriction that all auxiliary trees must represent non-wrapping adjunction is guaranteed by the way that the lexicalization graph is set up. For convenience, rules have the following form: left-hand-side "may consist of" right-hand-side. The "may consist of" notation is conventionally depicted by an arrow as shown below.

left-hand-side→right-hand-side

The right-hand-side, is a sequence of kinds of phrases and words. Thus this right-hand-side has a leftmost part and a rightmost part. For instance, the rule: a sentence, S, may consist of a noun phrase, NP, followed by a verb phrase, VP, is represented as shown below.

S→NP VP

The leftmost part of the right-hand-side of this rule is NP.

In the simplest embodiment of the subject invention, the lexicalization graph is created by considering only the interactions via the leftmost part of the right-hand-side of each rule. For example, the leftmost part of the right-hand-side of the rule above can interact with another rule: a noun phrase, NP, may consist of a determiner, DET, followed by a noun, N, as shown below.

NP→DET N

The 'interaction point' of these two rules is the leftmost part, NP, of the right-hand-side of the first rule. The interaction occurs via substitution of DET N for NP, yielding the derived rule shown below.

S→DET N VP

The fact that the lexicalization graph only considers leftmost interactions guarantees that there are never any words to the left of the interaction point. It can be shown that this in turn guarantees that the auxiliary trees created are non-wrapping.

Looking only at leftmost interactions is straightforward, but does not necessarily create the best possible grammar $G_2$. More complex embodiments of the subject invention create a lexicalization graph that includes a mixture of arcs representing leftmost and rightmost interactions. In essence, this is allowable as long as no minimal cyclic path contains both kinds of interactions, which in turn guarantees that the correspond auxiliary tree will be non-wrapping.

The benefit of using lexicalized context-free grammar appears in the subject system's parser. The most important aspect of the subject parser is the way adjoining rules are handled. Unrestricted adjoining rules can add two groups of items that are not next to each other. As a results when determining whether adjoining is applicable in a given sentence, parsers that support unrestricted adjoining rules have to consider groups of items that are not next to each other. Because, the subject lexicalized context-free grammar only allows non-wrapping adjoining rules, the subject parser only has to consider groups of words that are next to each other. This dramatically decreases the time required to parse a sentence.

As an example of the significance of only having to consider items that are next to each other consider the following. If a sentence contains n words, then there are only n−1 pairs of words where the two words are next to each other. In the same sentence there are (n−1)*(n−2) pairs of words where the two words are not next to each other. For a 10 word sentence this all order of magnitude difference in the number pairs that must be considered.

A second feature of the subject parser that contributes to its speed is that since the subject lexicalized context-free grammar is lexicalized, the subject parser dynamically filters the grammar by selecting only those rules that contain the words in the sentence. This eliminates most of the possible grammar rules from consideration.

As an example of the dynamic filtering of a grammar consider the following. Suppose that a lexicalized context-free grammar for English is being used that can handle sentences containing 10,000 different English words. Such a grammar would be expected to contain approximately 4 different rules for each word making a total of 40,000 rules. An example of such a rule would be: a noun phrase can consist of the determiner 'the' followed by a noun. This rule contains the word 'the'. Suppose that the subject parser is given the sentence "John loves Mary." The above rule need not be considered when parsing this sentence, because the sentence does not contain the word 'the'. Rather, the parser need only consider the 12 rules or so that contain the words 'John', 'loves' and 'Mary'.

A final feature of the subject parser that contributes to its speed is that it operates from left-to-right and at each step only considers rules that are consistent with all the preceding words in the sentence. This approach, which is referred to as maintaining the valid prefix property, is in essence a second kind of dynamic grammar filtering. When a parser is operating on a sentence, situations arise when it is only looking at part of the sentence. For example, when parsing the sentence "Mark thinks that John loves Mary" the situation will arise when the parser is considering how to parse just the last two words of this sentence, i.e., "loves Mary". The simplest thing to do is to simply use all the available rules when looking at this subpart of the sentence. However, by maintaining the valid prefix property, the subject parser can restrict its attention to only the rules that are consistent with the fact that the subpart of the sentence is preceded by the words "Mark thinks that John". This leads to an increase of parsing speed by orders of magnitude.

BRIEF DESCRIPTION OF THE DRAWINGS

These and other features of the invention will be better understood taken in conjunction with the Detailed Description in conjunction with the Drawings of which:

FIG. 13 is a diagrammatic representation of two derived auxiliary trees;

FIG. 14 is a diagrammatic representation of a complex derived auxiliary tree;

FIG. 15 is an example context-free grammar;

FIG. 16 is a diagrammatic representation of a lexicalization graph, drawn using the standard conventions for drawing the mathematical concept known as a directed graph;

FIG. 22 is a diagrammatic representation of two elementary lexicalized context-free grammar auxiliary trees that are created by the current invention.

FIG. 23 is an example context-free grammar;

FIG. 24 is a diagrammatic representation of a lexicalization graph;

FIG. 25 is a diagrammatic representation of a parse tree that can be derived in two ways;

DETAILED DESCRIPTION OF THE INVENTION

Figure 1:
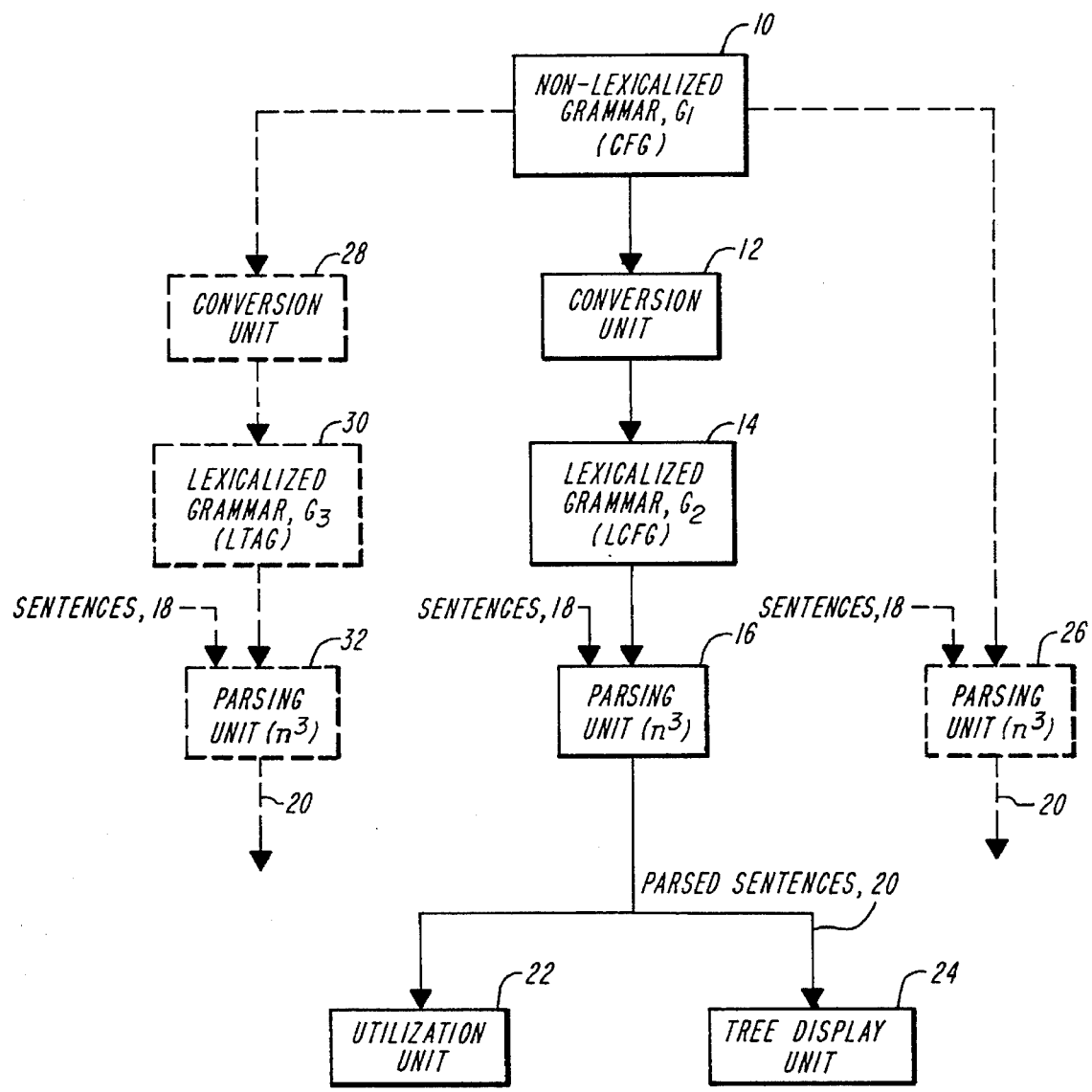
FIG. 1 is a diagrammatic representation of the components of the present invention, and includes a comparison with the prior art.

Referring now to FIG. 1, in the present invention a non-lexicalized grammar $G_1$, as indicated at 10, is converted by conversion unit 12 to a lexicalized grammar $G_2$, as indicated at 14. The non-lexicalized grammar $G_1$ is a context-free grammar, CFG. The lexicalized grammar is a lexicalized context-free grammar, LCFG. This lexicalized grammar $G_2$ is used by parsing unit 16, which parses sentences 18, to produce parsed sentences 20.

As illustrated at 22, the output of parsing unit 16 can be utilized by many processes such as: database access, ungrammatical sentence detection/correction, full-text document retrieval, message filtering, and a natural language translations. In database access, the utilization unit 22 converts the parsed sentences into computer database commands and displays the retrieved data for the user. In ungrammatical sentence detection/correction, the sentences come from a document; and the utilization unit 22 shows the user the sentences that are ungrammatical and suggestions how they might be modified to make them grammatical. In full-text document retrieval the sentences come from stored documents; and the utilization unit 22 inspects the parsed sentences to determine which sentences are relevant to a given topic and displays the documents containing these sentences to the user. In message filtering, the sentences come from electronic messages sent to the user; and the utilization unit 22 inspects the parsed sentences to determine which sentences are relevant to a given topic and selects the messages containing these sentences to display for the user. In natural language translation, the sentences come from a document; and the utilization unit 22 converts the parsed sentences into parsed sentences of another language, which are then converted to text and shown to the user.

The outputs of parsing unit 16 are trees, known as parse trees, that can be displayed by display unit 24. If a sentence is ambiguous in its syntactic structure, more than one tree is produced. If the sentence is ungrammatical, no trees are produced, and in one embodiment, this is indicated via an alarm or other means to the user of the system. Otherwise, one tree is produced.

Figure 2:
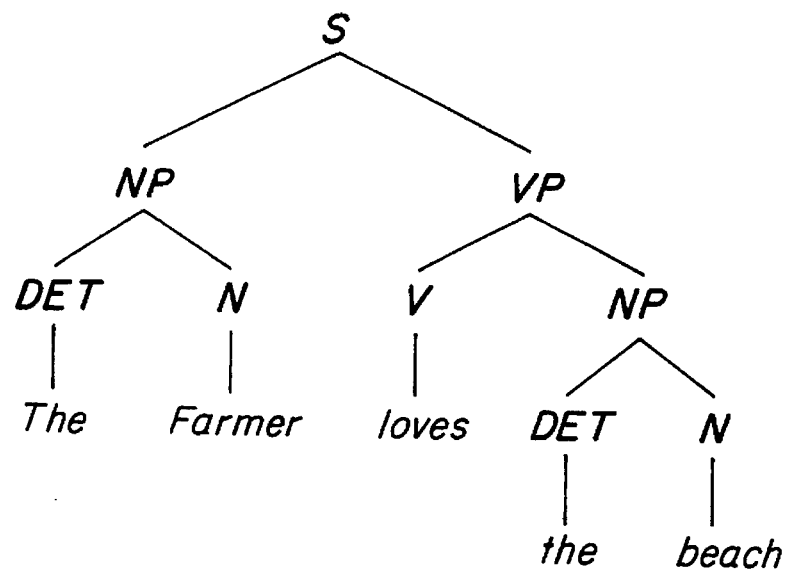
FIG. 2 is a diagrammatic representation of a parse tree using the standard conventions for drawing parse trees.

Referring now to FIG. 2, a tree generated by the subject system is illustrated as it might be displayed by display unit 24. The value of a parse tree is that it shows how the words in a sentence relate to each other. This is traditionally referred to as the syntactic structure of a sentence.

The parse tree in FIG. 2 is for the sentence "The farmer loves the beach". The tree consists of nodes and lines between the nodes. The lines descending from a node indicate that the node consists of the nodes below. The nodes along the bottom of the figure are labeled with the words in the sentence.

Each word is of a particular type. This is indicated by the node directly above the word. A node labeled N is a noun, such as 'farmer', 'beach', or 'table'. A node labeled V is a verb, such as 'loves', 'buys', or 'thinks'. A node labeled DET is a determiner, such as 'the', 'a', or 'this'.

A node labeled S is a complete sentence that can stand by itself. There are many forms that a sentence can take. This example is a simple declarative sentence with a subject, verb, and object. Traditionally, the verb and object of such a sentence are grouped together as a verb phrase, VP. A noun phrase NP, is a phrase that can act as a subject or object of a sentence. The VP and two NPs illustrated here are very simple in form. The English language allows many other kinds of sentences, verb phrases, and noun phrases in addition to the three simple kinds shown in FIG. 2. The purpose of a parser is to determine which kinds of structures apply to a given sentence and exactly where in the sentence they apply.

Referring back to FIG. 1, it is the purpose of the subject invention to derive parse trees in the least, possible time given sentences input to parsing unit 16. The key to this is the use of the special kind of lexicalized grammar indicated at 14 to be a lexicalized context-free grammar, LCFG.

As mentioned hereinbefore and illustrated by the dashed arrows and boxes on the right side of FIG. 1, the prior art includes parsing units 26 that can operate directly on the non-lexicalized grammar $G_1$. The best of these parsers operate with a parsing time $k_{26}*n^3$ for a sentence containing n words. As mentioned before, the problem with these parsing units is that the constant $k_{26}$ is so large that the parsing time forms a bottleneck in systems that utilize natural language input.

As described above, the prior art includes attempts to speed the parsing process by converting the non-lexicalized grammar $G_1$ into a lexicalized grammar. In particular, as illustrated by the dashed arrows and boxes on the left side of FIG. 1, $G_1$ can be converted by conversion unit 28 to lexicalized grammar $G_3$, as indicated at 30. Heretofore, the most effective approach to this has been to create a lexicalized grammar $G_3$ that is a lexicalized tree adjoining grammar, LTAG. This grammar can be parsed by parsing unit 32 in time $k_{32}*n^6$. As discussed previously, this approach succeeds in obtaining a constant factor $k_{32}$ that is significantly smaller than $k_{26}$. However, the increase of the exponent from 3 to 6 means that parsing unit 32 is much slower than parsing unit 26 on typical length sentences. In particular, for sentences of length 10 to 20 words, parsing unit 32 takes from 100 to 1000 times as long as parsing unit 26.

The value of the current invention comes from the fact that the running time of parsing unit 16 is $k_{16}*n^3$, where $k_{16}$ is much smaller than $k_{26}$. In contrast to parsing unit 32, parsing unit 16 operates with an exponent of 3, because conversion unit 12 creates a grammar $G_2$ that uses only non-wrapping adjoining rules.

An adjoining rule is a rule that permits the insertion of additional words into a sentence or phrase. A non-wrapping adjoining rule is one that permits the insertion of new words either before or after some part of the phrase; but not both. An example of a non-wrapping adjoining rule is one that says that you can insert adjectives in a noun phrase by adding them in front of the noun. For instance, "the farmer" can become "the wise farmer".

As mentioned above, the reason that parsing unit 16 is faster than parsing unit 32 is that when considering whether or not an adjunction rule is applicable in a sentence it need only consider adjacent groups of words. In contrast, because wrapping adjoining rules can introduce groups of words that are not next to each other, parsing unit 32 must consider groups of words that are not next to each other. This forces a great many more pairs of groups to be considered.

The reason that parsing units 16 and 32 have smaller constant time factors $k_{16}$ and $k_{32}$ than parsing unit 26, is because the grammars they use are lexicalized. This allows them to filter the grammar by considering only those rules that are relevant to the words in the sentence being parsed.

All three parsing units in FIG. 1 share the speed advantage that they maintain the valid prefix property when parsing. At each point in the sentence this allows them to gain the advantage of filtering the grammar by considering only the rules that are consistent with the preceding words in the sentence.

By way of further explanation, context-free grammar, CFG, has been a well accepted framework for computational linguistics for a long time. While it has drawbacks, it has the virtue of being computationally efficient, $O(n^3)$-time in the worst case for a sentence of length n. In addition, recognition and parsing algorithms exist that, while being no better than $O(n^3)$-time in the worst case, are very much better than this in the typical case.

A lexicalized grammar is one where every rule contains an explicit lexical item, e.g., a word in the lexicon. A grammar formalism $\mathcal{F}$ is said to lexicalized by another formalism $\mathcal{F}$ if every grammar G written in $\mathcal{F}$ can be converted into an equivalent lexicalized grammar G' in $\mathcal{F}$.

Lexicalization is of interest from a computational perspective, because other things being equal, lexicalized grammars can often be parsed much more efficiently than non-lexicalized ones. Lexicalization is of interest from a linguistic perspective, because most current linguistic theories give lexical accounts of a number of phenomena that used to be considered purely syntactic.

In general, CFGs are not lexicalized since they allow rules such as S→NP VP that do not locally introduce lexical items. In contrast, the well-known Greibach Normal Form, GNF, for CFG is lexicalized, because the first item on the right-hand side of every rule is required to be a lexical item, e.g., S→John VP.

As described in "A New Normal-Form Theorem For Context-Free Phrase-Structure Grammars" S. A. Greibach, Journal of the ACM, volume 12 pages 42–52, 1965, any CFG G, that does not derive the empty string, there is a GNF grammar G' that derives the same strings. For most grammars G, strings can be recognized much more quickly using G' than G, using left-to-right bottom-up algorithms.

Unfortunately, for most grammars G, it is not possible for the set of trees produced by G' to be the same as the set of trees produced by G. As a result, parsing with G' does not produce the same result as parsing with G.

Therefore, while GNF lexicalizes CFGs, this is only a weak lexicalization in the sense that while it preserves the sets of strings produced by the original grammar, it does not preserve the set of trees produced. Of more interest is strong lexicalization that preserves tree sets as well as string sets.

In the following, we use the term lexicalization only its strong sense. Note that in this strong sense, GNF does not lexicalize CFG. One can go further than this and say that CFG does not lexicalize CFG. The fundamental reason for this is that CFG specifies a one-to-one mapping from derivations to trees. Changing a rule that participates in any derivations changes the tree set. To achieve the lexicalization of CFGs one must switch to a formalism with greater derivational freedom, i.e., one where it is possible to modify a grammar in interesting ways without changing the tree set.

An interesting example of a formalism with greater derivational freedom than CFG is tree substitution grammar, TSG, which is discussed in detail in the above article by Joshi and Schabes, 1992.

In TSG, the combining operation is substitution just as in CFG, however, the items to be combined are extended to multi-level trees, called initial trees, instead of just one-level rules. Substitution combines two trees by replacing a leaf in one tree with another tree. A TSG G can be altered by combining initial trees with substitution to create larger initial trees without changing the trees produced.

The extra derivational freedom provided by TSG makes it possible to lexicalized many CFGs. However, as shown by the Joshi and Schabes 1992 article, TSG cannot be used to lexicalize every CFG.

Derivational freedom can be increased further by using the context-sensitive operation of adjunction. Adjunction combines two trees by expanding an internal node in one tree by inserting another tree. This opens up many more possibilities for altering a grammar without changing the trees produced and makes it possible to lexicalize CFG. In particular, as discussed by the Joshi and Schabes 1992 article, lexicalized tree adjoining grammar, LTAG, lexicalizes CFG in the strong sense defined above.

Unfortunately, context-sensitive operations entail much larger computation costs for parsing and recognition than CFGs. In particular, the fastest known LTAG parser requires $O(n^6)$-time in the worst case in contrast to $O(n^3)$ for CFG. As a result, there are no computational advantages to lexicalizing a grammar using LTAG because the speedup due to the grammar becoming lexicalized is swamped by the dramatic increase in fundamental worst-case cost.

Heretofore, every method for lexicalizing CFGs in the strong sense defined above has required context-sensitive operations. As a result, every method for lexicalizing CFGs has shared with LTAG the unfortunate feature that lexicalization leads to dramatically decreased rather than increased computational performance.

The primary feature of the subject invention is the provision of a grammar formalism called lexicalized context-free grammar, LCFG, that lexicalizes CFG while retaining $O(n^3)$-time worst-case computation bounds. This formalism allows the inherent computational advantages of lexicalization to be realized.

Like LTAG, LCFG allows adjunction. However, LCFG only allows a very restricted form of adjunction that is context-free in nature. As a result, LCFGs are only capable of generating context-free languages and carry the same worst case computation bounds as CFGs.

The second key feature of the subject invention is an easily automatable procedure for converting any CFG G into an equivalent LCFG G'. The third key feature of the subject invention is a highly efficient Earley-style parser for LCFG that maintains the valid prefix property. At least for many grammars G, it is possible to use this parser to parse strings using G' significantly faster than can be done by a parser working directly with G.

The following sections: present LCFG, discuss lexicalization in more detail, prove that LCFG lexicalizes CFG by showing a constructive lexicalization procedure, prove that LCFG can be parsed in $O(n^3)$-time by exhibiting a simple $O(n^3)$-time parser, and describe a highly efficient parser for LCFG.

1. Lexicalized Context-Free Grammar

Lexicalized context-free grammar, LCFG, is a tree generating system that is a restricted form of lexicalized tree-adjoining grammar, LTAG, as described in the above mentioned Joshi and Schabes 1992 article. Informally speaking, the grammar consists of two sets of trees: initial trees, which are combined by substitution and auxiliary trees, which are combined by adjunction. An LCFG is lexicalized because every initial and auxiliary tree is required to contain a terminal symbol on its frontier.

Definition 1 (LCFG) An LCFG is a five-tuple ($\Sigma$, NT, I, A, S), where $\Sigma$ is a set of terminal symbols, NT is a set of non-terminal symbols, I and A are finite sets of finite trees labeled by terminal and non-terminal symbols, and S is a distinguished non-terminal start symbol. The set I U A is referred to as the elementary trees.

The interior nodes in each elementary tree are labeled by non-terminal symbols. The nodes on the frontier of each elementary tree are labeled with terminal symbols, non-terminal symbols, and the empty string, $\epsilon$. At least one frontier node is labeled with a terminal symbol. With the possible exception of one node as explained below below, the non-terminal symbols on the frontier are marked for substitution. By convention, substitutability is indicated in diagrams by using a down arrow, $\downarrow$. Frontier nodes labeled with $\epsilon$ are referred to as empty.

The difference between auxiliary trees and initial trees is that each auxiliary tree has exactly one non-terminal frontier node that is marked as the foot. The foot must be labeled with the same label as the root. By convention, the foot of an auxiliary tree is indicated in diagrams by using an asterisk, *. The path from the root of an auxiliary tree to the foot is called the spine.

Auxiliary trees in which every non-empty frontier node is to the left of the foot are called left auxiliary trees. Similarly, auxiliary trees in which every non-empty frontier node is to the right of the foot are called right auxiliary trees. Other auxiliary trees are called wrapping auxiliary trees.

LCFG does not allow adjunction to apply to foot nodes or nodes marked for substitution. LCFG allows the adjunction of a left auxiliary tree and a right auxiliary tree on the same node. However, LCFG does not allow the adjunction of either two left or two right auxiliary trees on the same node.

Crucially, LCFG does not allow wrapping auxiliary trees. It does not allow elementary wrapping auxiliary trees, and it does not allow the adjunction of two auxiliary trees, if the result would be a wrapping auxiliary tree.

Figure 3:
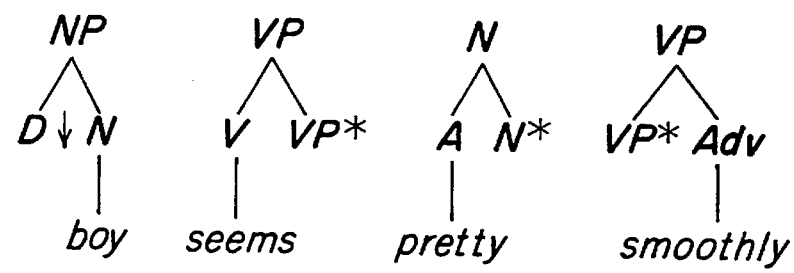
FIG. 3 is a diagrammatic representation of seven elementary parse trees that illustrate the kind of elementary parse trees that are utilized by lexicalized context-free grammars.
Figure 3:
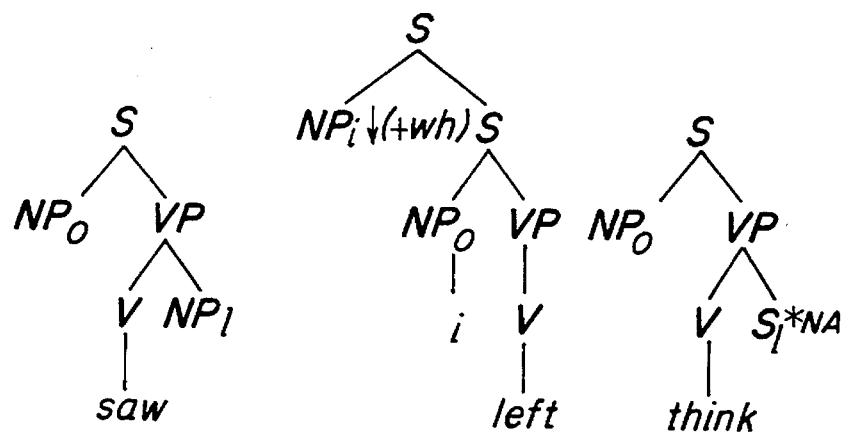

FIG. 3, shows seven elementary trees that might appear in an LCFG for English. The trees containing 'boy', 'saw', and 'left' are initial trees. The remainder are auxiliary trees.

An LCFG derivation must start with an initial tree rooted in S. After that, this tree can be repeatedly extended using substitution and adjunction. A derivation is complete when every frontier node is labeled with a terminal symbol.

Figure 4:
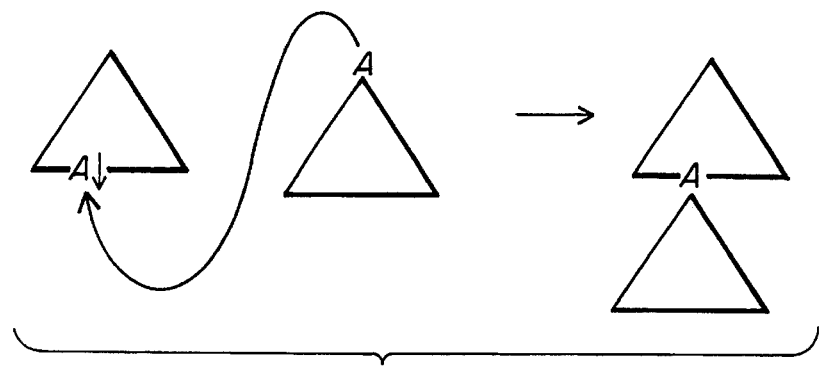
FIG. 4 is a diagrammatic representation of two parse trees being combined by substitution.

As illustrated in FIG. 4, substitution replaces a node marked for substitution with a copy of an initial tree.

Figure 5:
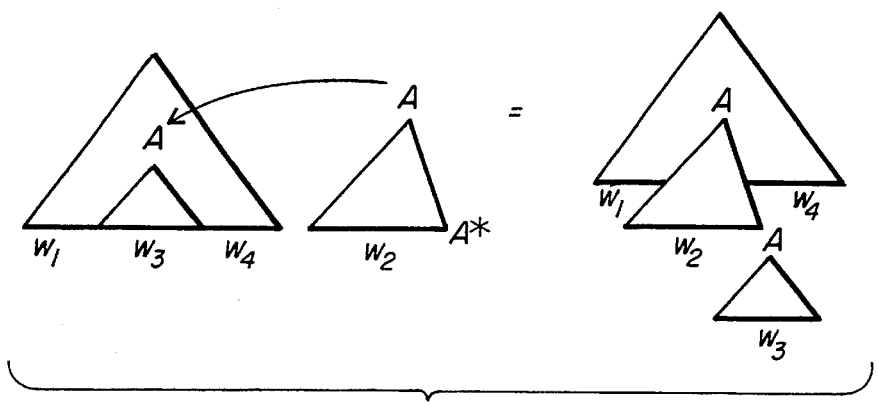
FIG. 5 is a diagrammatic representation of two parse trees being combined by left adjunction.
Figure 6:
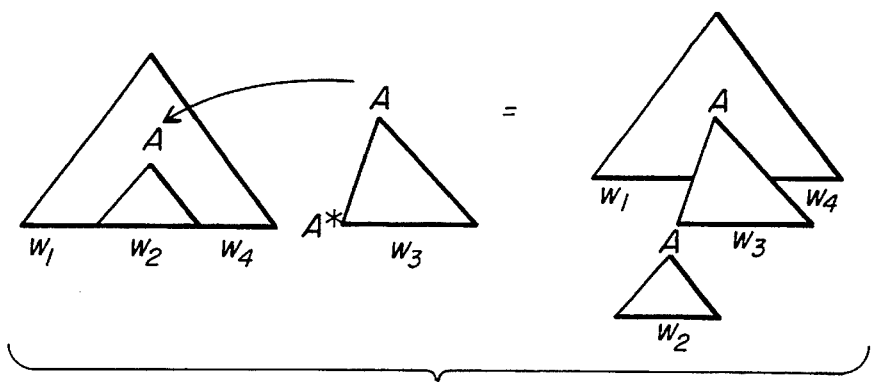
FIG. 6 is a diagrammatic representation of two parse trees being combined by right adjunction.

Adjunction inserts a copy of an auxiliary tree T into another tree at an interior node $\eta$ that has the same label as the root, and therefore foot, of T. In particular, $\eta$ is replaced by a copy of T and the foot of the copy of T is replaced by the subtree rooted at $\eta$. The adjunction of a left auxiliary tree is referred to as left adjunction. Left adjunction is illustrated in FIG. 5. The adjunction of a right auxiliary tree is referred to as right adjunction. Right adjunction is illustrated in FIG. 6.

LCFG's prohibition on wrapping auxiliary trees can be rephrased solely in terms of elementary trees. To start with, there must be no elementary wrapping auxiliary trees. In addition, an elementary left or right auxiliary tree cannot be adjoined respectively on any node that is on the spine of an elementary right or left auxiliary tree. Further, no adjunction whatever is permitted on a node $\eta$ that is to the right or left respectively of the spine of an elementary left or right auxiliary tree T. Note that for T to be a left or right auxiliary tree, every frontier node subsumed by $\eta$ must be labeled with $\epsilon$.

Tree adjoining grammar formalisms typically forbid adjunction on foot nodes and substitution nodes. In addition, they typically forbid multiple adjunctions on a node. However, in the case of LCFG, it is convenient to relax this latter restriction slightly by allowing right and left adjunction on a node, but at most once each. Due to the other restrictions placed on LCFG, this relaxation increases the trees that can be generated without increasing the ambiguity of derivations.

Figure 7:
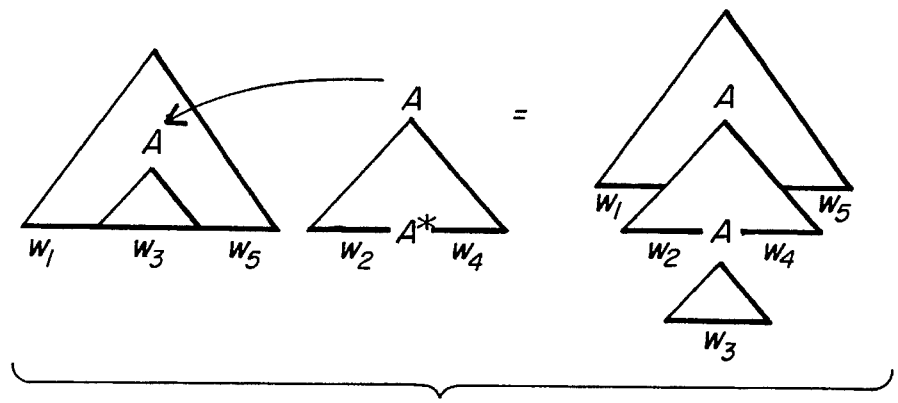
FIG. 7 is a diagrammatic representation of two parse trees being combined by wrapping adjunction.

The only important difference between LCFG and LTAG is that LTAG allows both elementary and derived wrapping auxiliary trees. The importance of this is that wrapping adjunction encodes string wrapping and is therefore context sensitive in nature. Wrapping adjunction is illustrated in FIG. 7. In contrast, as can be seen in FIGS. 5 and 6, left and right adjunction merely support string concatenation. As a result, while LTAG is context sensitive in nature, LCFG is limited to generating only context-free languages.

To see that LCFGs can only generate context free languages, consider that any LCFG G can be converted into a CFG generating the same strings in two steps as follows. First, G is converted in to a TSG G' that generates the same strings. Then, this TSG is converted into a CFG G".

A TSG is the same as an LCFG, or LTAG, except that there cannot be any auxiliary trees. To create G' first make every initial tree of G be an initial tree of G'. Next, make every auxiliary tree T of G be an initial tree of G'. When doing this, relabel the foot of T with $\epsilon$, turning T into an initial tree. In addition, let A be the label of the root of T. If T is a left auxiliary tree, rename the root to $A_L$; otherwise rename it to $A_R$.

To complete the creation of G' alter every node $\eta$ in every elementary tree in G' as follows: Let A be the label of $\eta$. If left adjunction is possible at $\eta$ add a new first child of $\eta$ labeled $A_L$, mark it for substitution, and add a new rule $A_L \rightarrow \epsilon$. If right adjunction is possible at $\eta$ add a new last child of $\eta$ labeled $A_R$, mark it for substitution, and add a new rule $A_R \rightarrow \epsilon$.

The TSG G' generates the same strings as G, because all cases of adjunction have been changed into equivalent substitutions. Note that the transformation would not work if LCFG allowed wrapping auxiliary trees. The TSG G' can be converted into a CFG " by renaming internal nodes so that they are unique and then decomposing the trees into one-level rules.

Although the string sets generated by LCFG are the stone as those generated by CFG, LCFG is capable of generating more complex sets of trees than CFGs. In particular, it is interesting to look at the path sets of the trees generated. The path set of a grammar is the set of all paths from root to frontier in the trees generated by the grammar. The path set is a set of strings over $\Sigma U$ NT U $\{\epsilon\}$.

The path sets for CFG, and TSG, are regular languages. In contrast, just as for LTAGS and TAGS, the path sets for LCFGs are context-free languages. To see this, consider that adjunction makes it possible to embed a sequence of nodes, the spine of the auxiliary tree, in place of a node on a path. Therefore, from the perspective of the path set, auxiliary trees are analogous to context-free productions.

Figure 8:
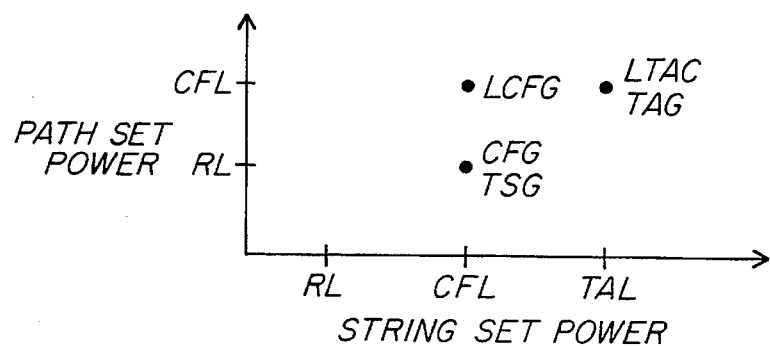
FIG. 8 is a graph relating the string set power and the path set power of lexicalized context-free grammar with related kinds of grammars.

FIG. 8 summarizes the relationship between LCFG and several other grammar formalisms. The horizontal axis shows the complexity of strings that can be generated by the formalisms, i.e., regular languages, RL, context-free languages, CFL, and tree adjoining languages, TAL. The vertical axis shows the complexity of the path sets that can be generated.

CFG, and TSG, create context-free languages, but the path sets they create are regular languages. LTAG and TAG generate tree adjoining languages and have path sets that are context-free languages. LCFG is intermediate in nature. It can only generate context-free languages, but has path sets that are also context-free languages.

2. Lexicalization

The question of whether a grammar is lexicalized is relevant no matter what the grammar is stated in terms of. The key concept is that each structure, e.g., production rule, elementary tree, in the grammar contains a lexical item that is realized. More precisely, a lexicalized grammar can be defined as follows:

Definition 2 (Lexicalized Grammars) A lexicalized grammar consists of a finite set of elementary structures of finite size, each of which contains an overt, i.e., non-empty, lexical item, and a finite set of operations for creating derived structures.

The overt lexical item in an elementary structure is referred to as its anchor. If more than one lexical item appears, either just one lexical item is designated as the anchor or a subset of the lexical items local to the structure are designated as a multi-component anchor.

A lexicalized grammar can be organized as a lexicon where each lexical item is associated with a finite number of structures for which that item is the anchor. This facilitates efficient parsing by, in effect, allowing the grammar to be dynamically restricted to only those rules that are relevant to the words that actually appear in a given sentence.

If each elementary structure contains a lexical item as its leftmost non-empty constituent, the grammar is said to be left anchored. This facilitates efficient left to right parsing.

Definition 3 (lexicalization) A formalism F is lexicalized by another formalism F', if for every finitely ambiguous grammar G in F that does not derive the empty string, there is a lexicalized grammar G' in F' such that G and G' generate the same tree set, and therefore the same string set. A lexicalization procedure is a procedure that generates G' from G.

The restrictions on the form of G are motivated by two key properties of lexicalized grammars. Lexicalized grammars cannot derive the empty string, because every structure introduces at least one lexical item. Thus, if a grammar is to be lexicalized, it must not be the case that $\Rightarrow \epsilon$. Lexicalized grammars are finitely ambiguous, because every rule introduces at least one lexical item into the resulting string. Thus, if a grammar is to be lexicalized, it must be only finitely ambiguous. In the case of a CFG, this means that the grammar cannot contain either elementary or derived recursive chain rules $\Rightarrow X$.

Figure 9:
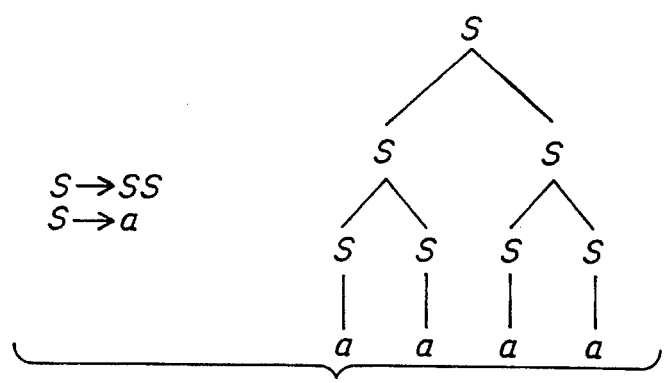
FIG. 9 is an example context-free grammar and on the right, a diagrammatic representation of a parse tree it creates.

As a focal point for discussion, consider the CFG in FIG. 9. The language generated by this grammar is a*. The tree set has the property that for any integer i it includes a tree where the shortest path from the root to any leaf is longer than i. In particular, in addition to many other trees, the CFG in FIG. 9 generates a balanced tree of the form shown on the right of the figure with minimum path length i+ 1 for the string $a^{2i}$. As argued in the Joshi and Schabes 1992 article, due to the unbounded nature of the trees produced, neither GNF, CFG, nor TSG is capable of lexicalizing the grammar in FIG. 9.

Greibach normal form, GNF, is a restricted form of CFG where every production rule is required to be of the form $A \rightarrow a\alpha$, where A is a non-terminal symbol, a is a terminal symbol, and $\alpha$ is a possibly empty string of non-terminal symbols. Every GNF is lexicalized, because every rule locally introduces a lexical item a, and like any CFG, GNF is required to have a finite number of finite rules.

Figure 10:
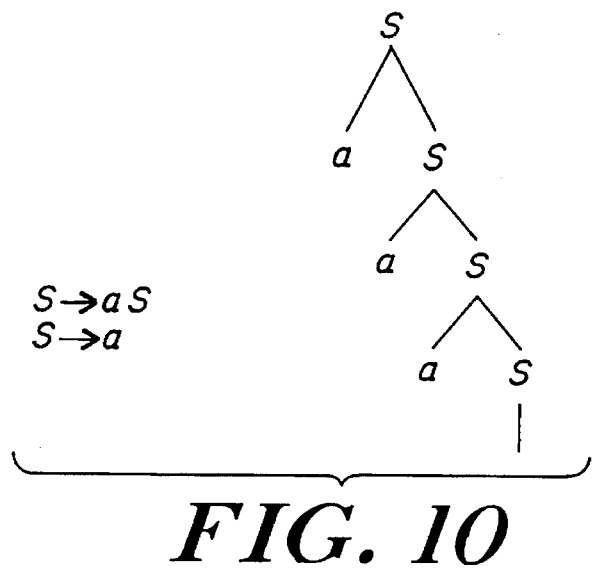
FIG. 10 is an example Greibach normal form grammar and on the right, a diagrammatic representation of a parse tree it creates.

The CFG in FIG. 9 can be put into GNF as shown in FIG. 10. However, this GNF is not a strong lexicalization of the grammar in FIG. 9, because while the two grammars generate the same language, they do not generate the same trees. In particular, the GNF shown only generates right linear trees like the one shown on the right of FIG. 10.

No GNF grammar can produce the same tree set as the CFG in FIG. 9, because no matter what the GNF grammar looks like, it is guaranteed that the first rule applied in any derivation will have a terminal symbol as its leftmost constituent. As a result, the length of the leftmost path in every tree derived by any GNF grammar is one.

The same basic argument that can be used to show that GNF does not lexicalize CFG can be used to show that CFG does not lexicalize CFG. For a CFG to be lexicalized, every rule must contain at least one terminal on its right-hand side. As a result, every generated tree must contain at least one path of length one. Therefore, no lexicalized CFG can generate the tree shown in FIG. 9.

To see that no TSG lexicalizes the CFG in FIG. 9 while preserving the trees generated, consider the following. For a TSG G to be lexicalized, it must consist of a finite number of finite initial trees and each tree must contain a lexical item. For each of these trees consider the length of the shortest path from the root to a non-terminal. Let i be the maximum of these shortest lengths. The topmost portion of any tree T derived by G is one of the initial trees of G. Therefore, the shortest path from the root to a non-terminal in T must be no longer than i. This is incompatible with the fact that there is no bound on the shortest path from the root to a terminal in the trees generated by the grammar in FIG. 9.

As argued in the next section, LCFG does lexicalize CFG. However, before looking at this in detail, it is instructive to consider how adjunction makes it possible to lexicalize the grammar in FIG. 9.

Figure 11:
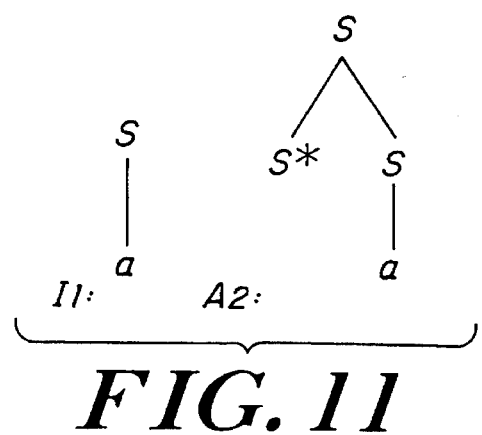
FIG. 11 is a diagrammatic representation of a lexicalized context-free grammar.

The CFG in FIG. 9 is lexicalized by the LCFG in FIG. 11. This LCFG consists of one initial tree I1 and one right auxiliary tree A2.

Figure 12:
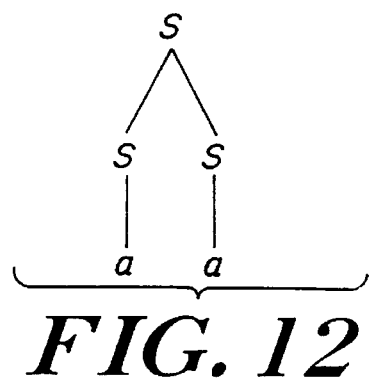
FIG. 12 is a diagrammatic representation of a parse tree for the string "aa"

Every derivation using the grammar in FIG. 11 begins by instantiating the initial tree I1. This produces the only possible tree whose fringe is a. One can then continue by adjoining the auxiliary tree A2 on the root of the initial tree I1 to produce the only possible tree whose fringe is aa. This tree is shown in FIG. 12.

Before adjoining the auxiliary tree A2 onto the root of the initial tree I1, one could adjoin the auxiliary tree A2 onto itself at either the root or its right child. These two adjunctions result in the two derived auxiliary trees, A3 and A4, shown in FIG. 13.

Adjoining the derived auxiliary trees A3 and A4 on the initial tree I1 results in the two trees that have aaa as their fringe. By adjoining the elementary auxiliary tree A2 a second time on the derived trees A3 and A4 and so on, one can create every possible tree whose fringe is in a*. In particular, adjoining the elementary auxiliary tree A2 to the right child of the root of the the derived auxiliary tree A3 creates the derived auxiliary tree in FIG. 14.

If the tree in FIG. 14 is adjoined on the initial tree I1, the balanced tree in FIG. 9 results. The key thing to notice about the derived auxiliary tree above is that the minimum distance from the root to a non-terminal is 3—greater than the minimum distance to a non-terminal in either of the elementary trees.

In general, the reason that adjunction allows lexicalization, is that starting with initial trees of bounded size, it is possible to generate trees of unbounded size, while at every step introducing non-terminals. This can be done, because the path from the root of a derived tree to a non-terminal can be altered after it is first introduced.

3. LCFG Lexicalizes CFG

In the following, we give a constructive proof of the fact that LCFG lexicalizes CFG.

Theorem If $G = (\Sigma, NT, P, S)$ is a finitely ambiguous CFG that does not generate the empty string, then there is an LCFG $G_L = (\Sigma, NT, I, A, S)$ generating the same language and tree set as G. Furthermore $G_L$ can be chosen so that it utilizes only right auxiliary trees.

As usual, a CFG G is a four-tuple $(\Sigma, NT, P, S)$ where $\Sigma$ is a set of terminal symbols, NT is a set of non-terminal symbols, P is a finite set of finite production rules that rewrite non-terminal symbols to strings of terminal and non-terminal symbols, and S is a distinguished non-terminal symbol that is the start symbol of any derivation.

To prove the theorem, we first prove a somewhat weaker theorem and then extend the proof to the full theorem. In particular, we assume for the moment that the set of rules for G does not contain any empty rules of the form $A \to \epsilon$.

Step 1 We begin the construction of $G_L$ by constructing a directed graph LG that we call the lexicalization graph. Paths in LG correspond to leftmost paths from root to frontier in, partial, derivation trees rooted at non-terminal symbols in G.

LG contains a node for every symbol in $\Sigma \cup NT$ and an arc for every rule in P as follows. For each terminal and non-terminal symbol X in G create a node in LG labeled with X. For each rule $X \to Y\alpha$ in G, where $Y \in \Sigma \cup NT$, create a directed are labeled with $X \to Y\alpha$ from the node in LG labeled with X to the node labeled Y.

Consider the example CFG in FIG. 15. For this grammar, Step 1 creates the LG shown in FIG. 16.

The significance of LG is that there is a one-to-one correspondence between paths in LG ending on a terminal and left-corner derivations in G. A left-corner derivation in a CFG is a, partial, derivation starting from a non-terminal where every expanded node, other than the root, is the leftmost child of its parent and the left corner is a terminal. A left-corner derivation is uniquely identified by the list of rules applied. Since G does not have any empty rules, every rule in G is represented in LG. Therefore, every path in LG ending on a terminal corresponds to a left-corner derivation in G and vice versa.

Step 2 The set of initial trees I for $G_L$ is constructed with reference to LG. In particular, an initial tree is created corresponding to each acyclic path in LG that starts at a non-terminal symbol X and ends on a terminal symbol y. An acyclic path is a path that does not visit any node twice.

For each acyclic path in LG from X to y, construct an initial tree T as follows. Start with a root labeled X. Apply the rules in the path one after another, always expanding the left-corner node of T. While doing this, leave all the non-left-corner non-terminal symbols in T unexpanded, and mark them as substitution nodes.

Figure 17:
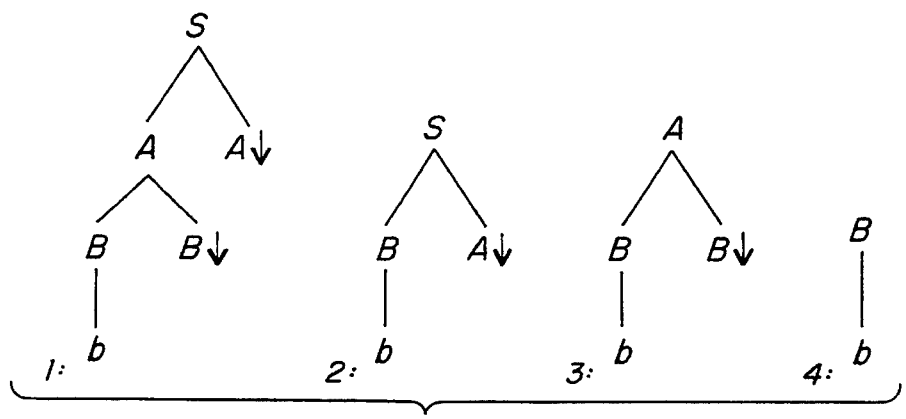
FIG. 17 is a diagrammatic representation of four lexicalized context-free grammar initial trees that are produced by the current invention.

Given the example grammar in FIG. 15 and its corresponding LG in FIG. 16, this step produces the initial trees shown in FIG. 17.

Each initial tree created is lexicalized, because each one has a terminal symbol as the leftmost element of its frontier. The last rule in each of the selected paths is a rule where the leftmost element on the right-hand side is a terminal.

A finite set of finite initial trees is created, because a finite set of finite paths is selected. Any directed graph containing a finite number of nodes and arcs has only a finite number of acyclic paths, each of which has a finite length.

Most importantly, the set of initial trees created is the set of non-recursive left-corner derivations in G. There is a one-to-one correspondence between paths in LG and left-corner derivations, and we have chosen every non-recursive path.

Step 3 This step constructs a set of right auxiliary trees corresponding to the cyclic path segments in LG. In particular, an auxiliary tree is created corresponding to each minimal cycle in LG. A minimal cycle is a path that does not visit any node twice, except for the node it starts and ends on.

For each minimal cycle in LG from a node X to X, construct an auxiliary tree T by starting with a root labeled X and repeatedly expanding left-corner frontier nodes using the rules in the path as in Step 2. When all the rules in the path have been used, the left-corner frontier node in T will be labeled X. Mark this as the foot node of T. While doing the above, leave all the other non-terminal symbols in T unexpanded, and mark them all as substitution nodes.

The LC in FIG. 16 has two minimal cyclic paths: one from A to A via B and one from B to B via A. For these cycles, Step 3 creates the two auxiliary trees shown in FIG. 18, one for A and one for B.

As in Step 2, a finite set of finite trees is created, because a finite set of finite paths is selected. A finite graph can have only finitely many minimal cycles, each of which has finite length. However unlike Step 2, the auxiliary trees created in Step 3 are not necessarily lexicalized.

Consider the set of trees that can be created by adjoining auxiliary trees from Step 3 with each other and the initial trees from Step 2. This resulting set of trees is the set of every left-corner derivation in G.

To see this, consider that every path in LG can be represented as an initial acyclic path with zero or more minimal cycles inserted into it. Given the one-to-one correspondence between paths in LG and left-corner derivations, this implies that any left-corner derivation can be generated by adjoining auxiliary trees corresponding to minimal cycles into initial trees corresponding to acyclic paths ending on terminals.

For instance, the path S, B, A, B, b in FIG. 16 is the acyclic path S,B,b with the minimal cycle B, A, B inserted into it. As shown in FIG. 19, the corresponding left-corner derivation in G is the second initial tree in FIG. 17 with the second auxiliary tree in FIG. 18 adjoined on the node labeled B.

Consider the set of trees that can be created by combining the initial trees from Step 2 with the auxiliary trees from Step 3 using both adjunction and substitution. This resulting set of trees is the tree set of G.

To see this, consider that every derivation in G can be decomposed into left-corner derivations in G that are combined with substitution and vice versa. In particular, every terminal node that is the leftmost child of its parent is the left-corner of a separate left-corner derivation.

Figure 20:
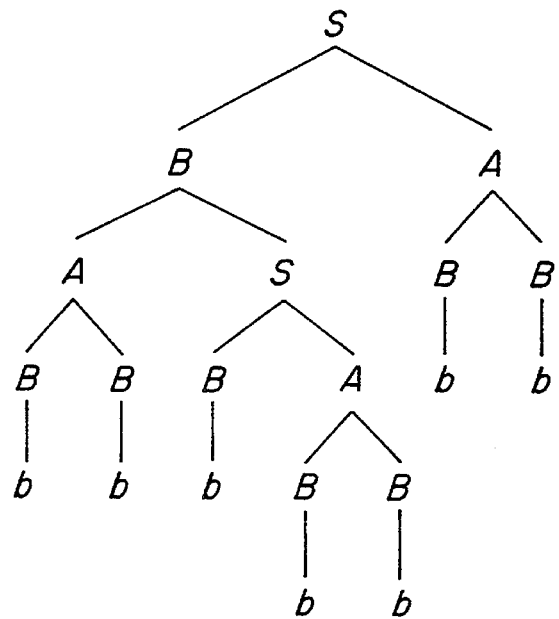
FIG. 20 is a diagrammatic representation of a complex parse tree.

For instance, the derived tree shown is FIG. 20 is composed of 7 left-corner derivations. From left to right along the fringe, these are the second initial tree with the second auxiliary tree adjoined into it, and the fourth, second, third, fourth, third, and fourth initial trees respectively.

Step 4 This step lexicalizes the set of auxiliary trees built in step 3, without altering the trees that can be derived.

For each auxiliary tree T built in step 3, consider the frontier node $\eta$ to the right of the foot. If this node is a terminal do nothing. Otherwise, remove T from the set of auxiliary trees. Then, add every auxiliary tree that can be constructed by substituting a compatible initial tree from Step 2 for $\eta$ T.

Note that since G is finitely ambiguous, there must be a frontier node to the right of the foot of an auxiliary tree T. If not, T would correspond to a derivation $\Rightarrow$X in G and G would be infinitely ambiguous.

Figure 21:
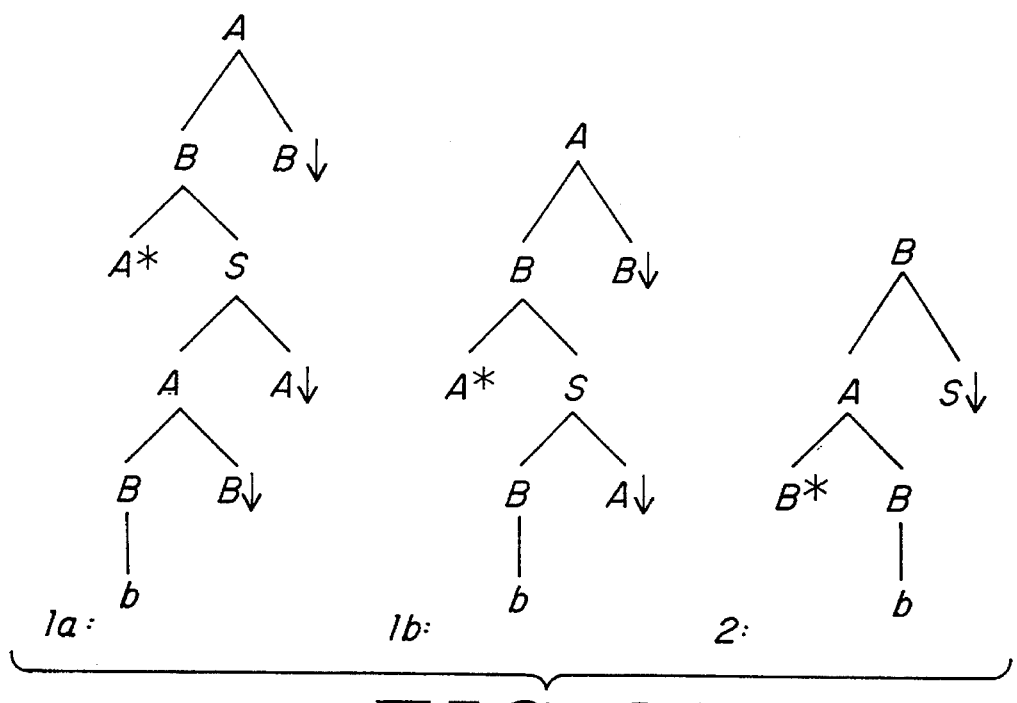
FIG. 21 is a diagrammatic representation of three elementary lexicalized context-free grammar auxiliary trees that are created by the current invention.

In the case of our continuing example, Step 4 results in the auxiliary trees in FIG. 21.

After Step 4, every auxiliary tree is lexicalized, since every tree that does not have a terminal to the right of its foot is replaced by one or more trees that do. Since there were only a finite number of finite initial and auxiliary trees to start with, there are still only a finite number of finite auxiliary trees.

The change in the auxiliary trees caused by Step 4 does not alter the set of trees that can be produced. The only action of Step 4 was to eliminate some nodes where substitution was previously possible. Whenever this was done, new trees were created corresponding to every substitution that could ever be done at these nodes.

Note that the initial trees are left anchored and the auxiliary trees are almost left anchored in the sense that the leftmost frontier node other than the foot is a terminal. This facilitates efficient left to right parsing.

The procedure above creates a lexicalized grammar that generates exactly the same trees as G and therefore the same strings. The only remaining issue is the auxiliary assumption that (1 does not contain empty rules. This assumption can be dispensed with in two steps as follows.

First, any finitely ambiguous CFG that does not derive the empty string can be converted into a TSG that generates the same trees and does not contain any empty trees. An empty tree is a tree where every element of the frontier is labeled with $\epsilon$. Second, the lexicalization procedure above can straightforwardly be extended to lexicalize any finitely ambiguous TSG that does not generate the empty string and does not contain any empty trees.

Suppose G contains one or more empty rules. One first constructs an equivalent TSG G', by converting every rule A→α into a one-level tree. In this tree, the root is labeled A and the elements of α become the labels of its children. Any non-terminal children are marked for substitution. This conversion does not change the trees that can be generated in any way. There is at least one empty tree in G'.

The empty trees in G' are eliminated by substituting them wherever possible as follows. Suppose T is an empty tree in G' whose root is labeled A. Note that since G does not derive the empty string, the root of T is not labeled S. For every substitutable node $\eta$ in G' labeled A: Make a copy of the tree containing $\eta$ with T substituted for $\eta$. If there is no tree other than T that can be substituted for $\eta$, discard the original tree containing $\eta$. Note that this step might generate additional empty trees, but it cannot generate a new empty tree whose root is labeled A. If it did, that would mean that there was previously a tree whose root is labeled A and all the non-empty frontier elements are labeled A. Given that there is also an empty tree whose root is labeled A, this implies that G is infinitely ambiguous in the way it derives the empty trees. The process above is iterated until no empty trees remain.

The grammar G'' which results from the elimination of the empty trees in G' still generates exactly the same trees. The only change is that every empty subtree that can be created by G has been created and substituted everywhere it can appear.

With minor modifications, the lexicalization procedure above can now be used to lexicalize G''. The key change is to modify LG to take account of trees instead of rules and trees whose left corner is $\epsilon$. The restated algorithm is as follows.

Step 1' LG contains a node for every terminal and non-terminal symbol and an arc for every initial tree as follows. For each terminal and non-terminal symbol X in the grammar create a node in LG labeled with X. For each initial tree T, let X be the label of the root of T and Y, where Y $\in \Sigma \cup$ NT, be the label of the leftmost frontier node that is not labeled with $\epsilon$. Create a directed arc labeled with T from the node in LG labeled with X to the node labeled Y.

There is a one-to-one correspondence between the modified LG and leftmost-nonempty derivations. A leftmost-nonempty derivation in a CFG is a, partial, derivation starting from a non-terminal where every expanded node, other than the root and nodes that head empty subtrees, is the leftmost child of its parent that does not head an empty subtree; and the leftmost non-empty node on the frontier is a terminal. With left-corner derivations replaced by leftmost-nonempty derivations, the rest of the procedure goes through as before.

Step 2' For each acyclic path in LG from X to y, construct an initial tree T as follows. Start with the tree corresponding to the first arc in the path. Substitute the trees in the rest of the path one after another, always substituting for the leftmost non-empty node of T. While doing this, leave all the other substitution nodes in T unchanged.

Step 3' For each minimal cycle in LG from a node X to X, construct an auxiliary tree T by starting with the tree corresponding to the first arc and repeatedly substituting for the leftmost non-empty frontier node using the trees in the rest of the path as in Step 2'. When all the trees in the path have been used, the leftmost non-empty frontier node in T will be labeled X. Change this from a substitution node to one marked as the foot of T. While doing the above, leave all the other substitution nodes in T unchanged.

Step 4' For each auxiliary tree T built in step 3' consider the first nonempty frontier node $\eta$ to the right of the foot. If this node is a terminal do nothing. Otherwise, remove T from the set of auxiliary trees. Then, add every auxiliary tree that can be constructed by substituting a compatible initial tree from Step 2' for η in T.

In the interest of simplifying the proof of the theorem, the presentation of the lexicalization procedure above was optimized for clarity, rather than for producing the best LCFG possible. When implementing the procedure steps should be made to minimize the size of the grammar produced and ensure that unnecessary ambiguity is not introduced into the grammar.

In the worst case, the number of initial and auxiliary trees in $G_L$ can be very much greater than the number of production rules in G. In particular, the number of elementary trees in $G_L$ is related to the number of acyclic and minimal cycle paths in LG. In the worst case, this number can rise very fast as a function of the number of arcs in LG— that is to say, as a function of the number of rules in P. A fully connected graph of $n^2$ arcs between n nodes has n! acyclic paths and n! minimal cycles.

Fortunately, a truly exponential explosion is unlikely in the typical case; and in the typical case, a lot can be done to reduce the number of elementary trees required for lexicalization.

In particular, there are several places in the algorithm where alternative choices for how to proceed are possible. By picking the best of these choices, a smaller LCFG can be produced. For instance, when lexicalizing the auxiliary trees created in step 2, you need not do anything if there is any frontier node that is a terminal. Further, if a frontier node must be expanded, you can choose the node that corresponds to the smallest number of initial trees, rather than the leftmost. Using this approach, one can lexicalize the grammar in FIG. 15 using just the two auxiliary trees shown in FIG. 22.

Alternatively, everywhere in the procedure, the word 'right' can be replaced by 'left' and vice versa. This results in the creation of a set of right anchored initial trees and left auxiliary trees. This can be of interest when the LG corresponding to right-corner derivations has fewer cycles than the LG corresponding to left-corner derivations. For instance, consider the example in FIG. 23.

The LG corresponding to left-corner derivations for this grammar is the same as in FIG. 16, however, the LG for right-corner derivations has no cycles as shown in FIG. 24. Using the LG for right-corner derivations, the grammar in FIG. 23 can be lexicalized using an LCFG that does not require any auxiliary trees and is therefore merely a TSG.

Going beyond this, one is not limited to using either all leftmost or all rightmost arcs in LG. When adding the arc for a rule A→α one is free to connect the arc from A to any symbol, other than the empty string, in α. The only requirement is that every minimal cycle in the resulting LG must consist solely of either leftmost or rightmost derivation arcs and when when a minimal cycle is nested in another minimal cycle, the two cycles must have the same kind of arcs. Arcs that do not participate in any cycles do not need to be either leftmost or rightmost, because they will not contribute to any auxiliary trees. Using the full freedom of choice indicated above, one can often create an LG that has many fewer acyclic paths and minimal cycles than the LG corresponding to left-, or right-, corner derivations.

In the simple form presented above, the lexicalization procedure can result in an LCFG $G_L$ that is ambiguous in the way it creates the derivation trees of G. This matters because it adds to the time required to parse with $G_L$. As an illustration of this problem, consider the left-corner derivation shown in FIG. 25 for the CFG in FIG. 15.

Figure 18:
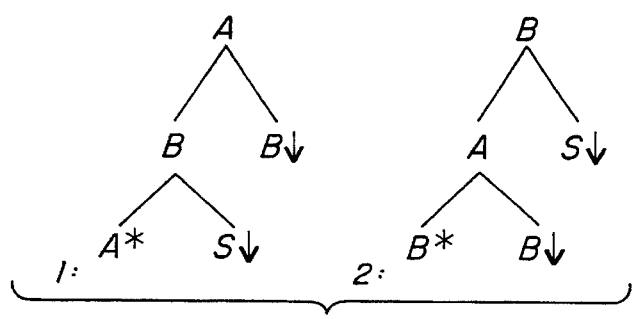
FIG. 18 is a diagrammatic representation of two elementary auxiliary trees that are created by an intermediate step of the current invention.
Figure 19:
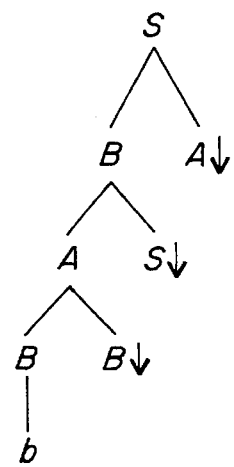
FIG. 19 is a diagrammatic representation of a parse tree corresponding to a left-corner derivation.

This tree can be created by starting from the first initial tree in FIG. 17 and adjoining the first auxiliary tree in FIG. 18 at A. However, it can also be created by starting from the first initial tree in FIG. 17 and adjoining the second auxiliary tree in FIG. 18 at B.

In general, the longer the minimal cycles in L, the greater ambiguity there will be in the way $G_L$ derives trees. Fortunately, by introducing constraints on what auxiliary trees are allowed to adjoin on what nodes in which initial trees, it is possible to greatly reduce and often completely eliminate this ambiguity.

4. LCFG is Cubic-Time Parsable

This section proves that LCFG is parsable in $O(n^3)$-time by exhibiting a simple bottom-up recognizer for LCFG that is in the style of the CKY parser for CFG. The next section describes a much more efficient and more elaborate recognizer for LCFG that achieves the same worst case bounds.

Suppose that G= ($\Sigma$, NT, I, A, S) is an LCFG and that $a_1 \ldots a_{12}$ is an input string. Let η be a node in an elementary tree, identified by the name of the tree and the position of the node in the tree.

Label(η) ε$\Sigma$U NT U ε is the label of the node. The predicate IsInitialRoot(η) is true if and only if η is the root of an initial tree. Parent(η) is the node that is the parent of η or ⊥ if η has no parent. FirstChild(η) is the node that is the leftmost child of η or ⊥ if η has no children. Sibling(η) is the node that is the next child of the parent of η, in left to right order, or ⊥ if there is no such node. The predicate Substitutable(ρ,η) is true if and only if η is marked for substitution and ρ is the root of an initial tree that can be substituted for η.

If ρ is the root of an auxiliary tree, then Foot(ρ) is the foot of the tree, otherwise Foot(ρ)= ⊥. Conversely if φ is the foot of an auxiliary tree then Root(φ) is the root of the tree, otherwise Root(φ)= ⊥. The predicate Adjoinable(ρ,η) is true if and only if ρ is the root of an elementary auxiliary tree that can adjoin on η. The predicate Radjoinable(ρ,η) is true if and only if ρ is the root of an elementary right auxiliary tree that can adjoin on η. The predicate Ladjoinable(ρ,η) is true if and only if ρ is the root of an elementary left auxiliary tree that can adjoin on η.

Figure 26:
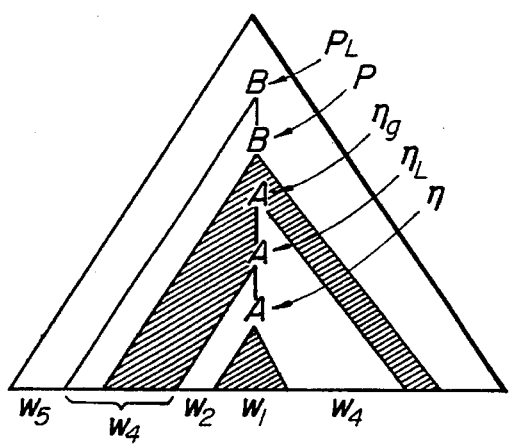
FIG. 26 is a diagrammatic representation of the various segments of a derived string that are related to a given internal node in a parse tree.

FIG. 26 shows a tree generated by G. The bottommost node labeled A is an instance of a node η in some elementary tree T. The bottommost node labeled B is the corresponding instance of the root ρ of T. The middle node labeled A is an instance of the root $η_L$ of a left auxiliary tree that was adjoined on η. The topmost node labeled A is an instance of the root $η_R$ of a right auxiliary tree that was adjoined on η. Similarly, the topmost node labeled B is an instance of the root $ρ_L$ of a left auxiliary tree adjoined on ρ. In the following these nodes will be referred to as ◁—η, ◁—ρ, ◁—$η_L$, ◁—$η_R$, and ◁—$ρ_L$, respectively.

It is useful to have names for various segments of the fringe of the tree generated by G. In the order of the numbered substrings along the bottom of FIG. 26, the segments of interest are: The span $ω_1$ of ◁—η is the fringe of the subtree rooted at ◁—η. The left concatenated string $ω_2$ of ◁—η is the portion of the span of ◁—$η_L$ that is left of the span of ◁—η. The right concatenated string $ω_3$ of ◁—η is the portion of the span of ◁—$η_R$ that is right of the span of ◁—η. The basic left context $ω_4$ of ◁—η is the left concatenated string of ◁—ρ plus the portion of the span of ◁—ρ that is left of the left concatenated string of ◁—η and the span of ◁—η. The far left context $ω_5$ is everything from the extreme left corner of the whole generated tree up to but not including the basic left context of ◁—η.

If there is no left auxiliary tree adjoined on η, then the left concatenated string of ◁—η is empty. If there is no right auxiliary tree adjoined on η, then the right concatenated string of ⊲—η is empty. If η is the root of an elementary tree, then η and ρ and therefore ⊲—η and ⊲—ρ are the same node, and the basic left context of ⊲—η is empty.

If η is on the spine of an auxiliary tree T, then the coverage of ⊲—η is the span of ⊲—η with the span of the node filling the foot of T removed. If η is not a spine node, then the coverage of ⊲—η is the same as the span of ⊲—η. Since LCFG does not allow wrapping auxiliary trees, the coverage of an instance a node is always a single contiguous string. There can be tree structure on both sides of a foot, but the frontier of one of these sides must consist solely of nodes labeled with ε.

Since substitution nodes and foot nodes φ are replaced during derivations, they do not appear directly in derived trees. However, a node that replaces such a node φ is taken to be an instance of φ, as well as an instance of the node it is a copy of. For example, the root corresponding to ⊲—$η_L$ was replaced by ⊲—η. The span of the instance of this root is therefore the span of ⊲—η, while the coverage of the instance of this root is the empty string.

We can assume without loss of generality that every node in I U A has at most two children. By adding new nodes, any LCFG can be transformed into an equivalent LCFG satisfying this condition. This transformation can be readily reversed after one or more parses have been found.

The algorithm stores pairs of the form [η,code] in an n by n array C. In a pair, code is a set over the universe L, for left adjunction, and R, for right adjunction. The fact that [η, code]∈C[i,k] means that there is some derivation of some string in which an instance of η accounts for the substring $a_{i+1} \ldots a_k$. More precisely, for every node η in every elementary tree in G, the algorithm guarantees that:

[η, θ] ∈ C[i,k] if and only if there is some derivation in G where $a_{i+1} \ldots a_k$ is the coverage of an instance of η.

[η, {L}] ∈ C[i,k] if and only if there is some derivation in G where $a_{i+1} \ldots a_k$ is the left concatenated string followed by the coverage of an instance of η.

[η, {R}] ∈ C[i,k] if and only if there is some derivation in G where $a_{i+1} \ldots a_k$ is the coverage followed by the right concatenated string of an instance of η.

[η, {L,R}] ∈ C[i,k] if there is some derivation in G where $a_{i+1} \ldots a_k$ is the left concatenated string followed by the coverage followed by the right concatenated string of an instance of η. The process starts by placing each foot node and each frontier node that is labeled with the empty string in every cell C[i,i]. This signifies that they each cover the empty string at all positions. The initialization also puts each terminal node η in every cell C[i,i + 1] where η is labeled $a_{i+1}$. The algorithm then considers all possible ways of combining matched substrings into longer matched substrings—it fills the upper diagonal portion of the array C[i,k], where 0≤i≤k≤n, for increasing values of k–i.

Two observations are central to the efficiency of this process. Since every auxiliary tree, elementary and derived, in LCFG is either a left or right auxiliary tree, the substring matched by a tree is always a contiguous string. Further, when matched substrings are combined, one only has to consider adjacent substrings. In LTAG, a tree with a foot can match a pair of strings that are not contiguous, one left of the foot and one right of the foot.

There are three situations where combination of matched substrings is possible: sibling concatenation, left concatenation, and right concatenation.

Figure 27:
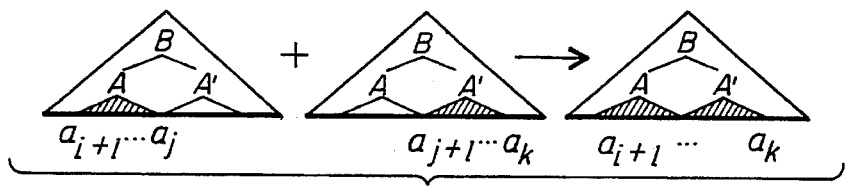
FIG. 27 is a diagrammatic representation of sibling concatenation.

As illustrated in FIG. 27, sibling concatenation combines the substrings matched by two sibling nodes into a substring matched by their parent. In particular, suppose that there is a node $η_o$, labeled B in FIG. 27, with two children $η_1$, labeled A, and $η_2$, labeled A'. If [$η_1$,{L,R}]∈ C[i,j] and [$η_2$, {L,R}] ∈ C [j,k] then [$η_o$, ∅] ∈ C[i,k].

Figure 28:
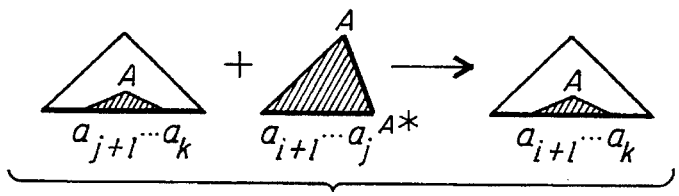
FIG. 28 is a diagrammatic representation of left concatenation.
Figure 29:
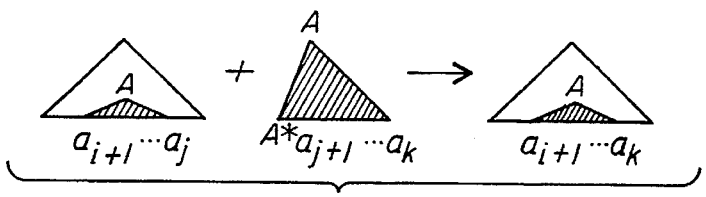
FIG. 29 is a diagrammatic representation of right concatenation.

As illustrated in FIG. 28, left concatenation combines the substring matched by a left auxiliary tree with the substring matched by a node the auxiliary tree can adjoin on. As illustrated in FIG. 29 right concatenation is analogous.

As shown below, the recognizer, is written in two parts: a main procedure Recognize shown below and a subprocedure Add. The Recognize procedure repeatedly scans the array C, building up longer and longer matched substrings until it determines whether any S-rooted derived tree matches the entire input. The purpose of the codes, { L,R} etc., is to insure that left and right adjunction can each be applied at most once on a node.

```
Procedure Recognize
begin
        ;; foot node and empty node initialization(C[i,i])
        for i = 0 to n
            for all foot nodes φ in A; Add(φ,∅,i,i)
            for all nodes η in A∪I where Label(η) = ε; Add(η,∅,i,i)
        ;; terminal node initialization (C[i,i + 1])
        for i = 0 to n − 1
            for all nodes η in A∪I where Label(η) = a_{i+i}; Add(η,∅ i,i + 1)
        ;; induction (C[i,k] = C[i,j] + C[j,k])
        for d = 2 to n
            for i = 0 to n − d
                set k = i + d
                for j = i to k
                    ;; sibling concatenation
                    if η,{L,R} ∈ C[i,j] and [Sibling(η),{L,R}] ∈ C[j,k]; Add(Parent(η),∅,i,k)
                    ;; left concatenation
                    if [p,{L,R}] ∈ C[i,j] and [η,code] ∈ C[j,k] and L ∉ code and Ladjoinable(p,η);
                        Add (η,L∪code,i,k)
                    ;; right concatenation
                    if [η,code] ∈ C[i,j] and [p,{L,R}] ∈ C[j,k] and R ∉ code and Radjoinable(p,η);
                        Add(ηR∪code,i,k)
        for each node ρ such that IsInitialRoot(ρ) and Label(ρ) = S;
            If [p,{L,R}] ∈ C[0,n]; return acceptance
end
Procedure Add(η,code,i,k)
```

-continued

```
begin
    if[η,code] ∉ C[i,k];
        C[i,k] := C[i,k]∪[η,code]
        ;; single child parent propagation
        if code = {L,R} and FirstChild(Parent(η)) = η and Sibling(η) = ⊥;
        Add(Parent(η),0,i,k)
        ;; substitution
        if code = {L,R}; for each node φ such that Substitutable(η,φ); Add(φ,0,i,k)
        ;; allowing skipping left adjunction
        if L ∉ code; Add(η,L∪code,i,k)
        ;; allowing skipping right adjunction
        if R ∉ code; Add(η,R∪code,i,k)
end
```

The procedure Add puts a pair into the array C. If the pair is already present, nothing is done. However, if it is new, it is added to C and other pairs may be added as well. These correspond to situations where information is propagated without increasing the length of the matched string—i.e., when a node is the only child of its parent, when adjunction is not performed, and when substitution occurs.

The $O(n^3)$ complexity of the recognizer follows from the three nested induction loops on d, i and j. Although the procedure Add is defined recursively, the number of pairs added to C is bounded by a constant that is independent of sentence length.

The algorithm does not depend on the fact that LCFG is lexicalized—it would work equally well if were not lexicalized.

By recording how each pair was introduced in each cell of the array C, one can extend the recognizer to produce all derivations of the input.

5. An Earley-Style Cubic-Time Parser For LCFG

By combining top-down prediction as in Earley's algorithm for parsing CFGs, as described in "An Efficient Context-Free Parsing Algorithm" J. C. Earley, Communications of the ACM, volume 13 number 2 pages 94–102, 1970, with bottom-up recognition as in the last section, one can obtain a more efficient left-to-right parsing algorithm for LCFG that maintains the valid prefix property and requires $O(n^3)$ time in the worst case. The algorithm is a general recognizer for LCFGs, which requires no condition on the grammar.

The algorithm collects states into a set called the chart $\mathcal{C}$. A state is a 4-tuple, [η,pos,i,j], where: η is a node in an elementary tree; pos ∈ {la, lb, ra, rb} is a position as described below; and $0 \leq i \leq j \leq n$ are integers ranging over positions in the input string.

Figure 30:
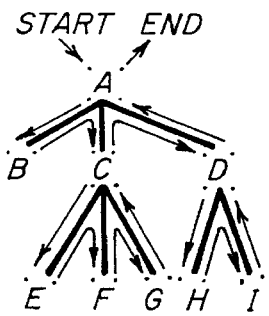
FIG. 30 is a diagrammatic representation of the steps in a top-down left-to-right traversal of a parse tree.

During parsing, elementary trees are traversed in a top-down, left-to-right manner that visits the frontier nodes in left-to-right order. The position codes are used to represent the state of this traversal. In diagrams the positions are indicated by placing a dot either: left and above la, left and below lb, right and below rb, or right and above ra the node. As illustrated in FIG. 30, the traversal begins left and above the root node and ends right and above the root node.

Figure 31:
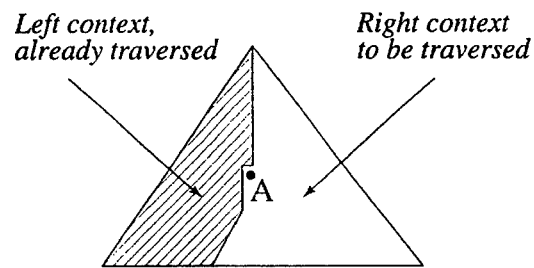
FIG. 31 is a diagrammatic illustration of the notions of left and right context in a parse tree.

In a manner analogous to dotted rules for CFG as defined by Earley, being at a particular position with regard to a particular node, divides the tree containing the node into two parts: a left context consisting of nodes that have been already been traversed and a right context that still needs to be traversed. The situation where one is la a node is illustrated in FIG. 31.

The indices i,j record the portion of the input string which is the left context. The fact that LCFG forbids wrapping auxiliary trees guarantees that a pair of indices is always sufficient for representing the left context. As traversal proceeds, the left context grows larger and larger. In particular, for every node η in every elementary tree in G, the algorithm guarantees the following.

[η,la,i,j] ∈ $\mathcal{C}$ if and only if there is some derivation in G where $a_1 \ldots a_i$ is the far left context of an instance of η and $a_{i+1} \ldots a_j$ is the basic left context of the instance of η. The basic left context is illustrated in FIG. 26.

[η,lb,i,j] ∈ $\mathcal{C}$ if and only if there is some derivation in G where $a_1 \ldots a_i$ is the far left context of an instance of η and $a_{i+1} \ldots a_j$ is the basic left context followed by the left concatenated string of the instance of η.

[η,rb,i,j] ∈ $\mathcal{C}$ if and only if there is some derivation in G where $a_1 \ldots a_i$ is the far left context of an instance of η and $a_{i+1} \ldots a_j$ is the basic left context followed by the left concatenated string followed by the coverage of the instance of η.

[η,ra,i,j] ∈ $\mathcal{C}$ if and only if there is some derivation in G where $a_1 \ldots a_i$ is the far left context of an instance of η and $a_{i+1} \ldots a_j$ is the basic left context followed by the left concatenated string followed by the coverage followed by the right concatenated string of the instance of η.

Figure 32:
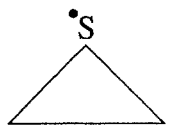
FIG. 32 is a diagrammatic illustration of the initialization step in the parsing unit of the subject invention.

The recognition algorithm is depicted below as a set of production rules. Rule 1 initializes the chart by adding all states of the form [η,1a,0,0], where η is the root of an initial tree and Label(η)= S. As illustrated in FIG. 32, the initial states encode the fact that any valid derivation must start from an S-type initial tree.

Initialization

IsInitialRoot(η) ∧ Label(η) = S → [η,la,0,0] ∈ $\mathcal{C}$    (1)

Traversal

[η,lb,i,j] ∈ $\mathcal{C}$ ∧ FirstChild(η) ≠ ⊥ → [FirstChild(η),la,i,j] ∉ $\mathcal{C}$    (2)

[η,ra,i,j,] ∈ $\mathcal{C}$ ∧ Sibling(η) ≠ ⊥ → [Sibling(η),la,i,j] ∈ $\mathcal{C}$    (3)

-continued $$[\eta,ra,i,j] \notin \mathcal{C} \wedge \text{Sibling}(\eta) = \bot \wedge \text{Parent}(\eta) \neq \bot \rightarrow [\text{Parent}(\eta),rb,i,j] \in \mathcal{C} \quad (4)$$
$$\text{Left Adjunction}$$

$$[\eta,la,i,j] \in \mathcal{C} \wedge \text{Ladjoinable}(\rho,\eta) \rightarrow [\rho,la,j,j] \in \mathcal{C} \quad (5)$$
$$[\eta,la,i,j] \in \mathcal{C} \rightarrow [\eta,lb,i,j] \in \mathcal{C} \quad (6)$$
$$[\eta,la,i,j] \in \mathcal{C} \wedge [\rho,ra,j,k] \in \mathcal{C} \wedge \text{Ladjoinable}(\rho,\eta) \rightarrow [\eta,lb,i,k] \in \mathcal{C} \quad (7)$$
$$\text{Scanning}$$

$$[\eta,lb,i,j] \in \mathcal{C} \wedge \text{Label}(\eta) = a_{j+1} \rightarrow [\eta,rb,i,j+1] \in \mathcal{C} \quad (8)$$
$$[\eta,lb,i,j] \in \mathcal{C} \wedge \text{Label}(\eta) = \epsilon \rightarrow [\eta,rb,i,j] \in \mathcal{C} \quad (9)$$
$$[\text{Foot}(\rho),lb,i,j] \in \mathcal{C} \rightarrow [\text{Foot}(\rho),rb,i,j] \in \mathcal{C} \quad (10)$$
$$\text{Substitution}$$

$$[\eta,lb,i,j] \in \mathcal{C} \wedge \text{Substitutable}(\rho,\eta) \rightarrow [\rho,la,j,j] \in \mathcal{C} \quad (11)$$
$$[\eta,lb,i,j] \in \mathcal{C} \wedge [\rho,ra,j,k] \in \mathcal{C} \wedge \text{Substitutable}(\rho,\eta) \rightarrow [\eta,rb,i,k] \in \mathcal{C} \quad (12)$$
$$\text{Right Adjunction}$$

$$[\eta,rb,i,j] \in \mathcal{C} \wedge \text{Radjoinable}(\rho,\eta) \rightarrow [\rho,la,j,j] \in \mathcal{C} \quad (13)$$
$$[\eta,rb,i,j] \in \mathcal{C} \rightarrow [\eta,ra,i,j] \in \mathcal{C} \quad (14)$$
$$[\eta,rb,i,j] \in \mathcal{C} \wedge [\rho,ra,j,k] \in \mathcal{C} \wedge \text{Radjoinable}(\rho,\eta) \rightarrow [\eta,ra,i,k] \in \mathcal{C} \quad (15)$$
$$\text{Final Recognition}$$

$$[\eta,ra,0,n] \in \mathcal{C} \wedge \text{IsInitial Root}(\eta) \rightarrow \text{Acceptance} \quad (16)$$

The addition of a new state to the chart $\mathcal{C}$ can trigger the addition of other states as specified by the productions above. Computation proceeds with the introduction of more and more states until no more rules can be fired. Rule 16 specifies that the input is recognized if and only if the final chart contains a state of the form $[\eta,ra,0,n]$, where $\eta$ is the root of an initial tree and Label$(\eta)$=S.

The traversal rules control the left-to-right traversal of elementary trees. The scanning, and substitution rules recognize substitutions of trees and are similar to the steps found in Earley's parser for CFGs. The left and right adjunction rules recognize the adjunction of left and right auxiliary trees. These 14 rules are discussed in detail below.

The traversal rules 2–4 move from node to node in initial trees as indicated by the arrows in FIG. 30.

Figure 33:
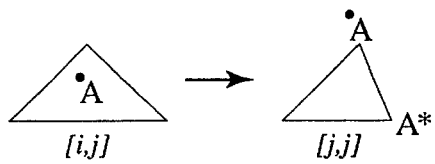
FIG. 33 is a diagrammatic illustration of the left adjunction prediction step in the parsing unit of the subject invention.

The left adjunction rules recognize left adjunction and move from position la to lb. As depicted in FIG. 33, rule 5 predicts the presence of left auxiliary trees. It does this top down taking account of the left context.

Figure 34:
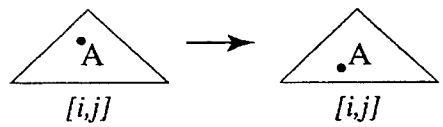
FIG. 34 is a diagrammatic illustration of the left adjunction skipping step in the parsing unit of the subject invention.

As depicted in FIG. 34, rule 6 considers the possibility that left adjunction does not occur.

Figure 35:
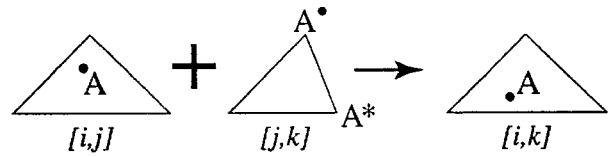
FIG. 35 is a diagrammatic illustration of the left adjunction completion step in the parsing unit of the subject invention.

As depicted in FIG. 35, rule 7 recognizes the adjunction of a left auxiliary tree. It is a bottom-up step, which combines a fully recognized left auxiliary tree with a partially recognized tree.

Figure 36:
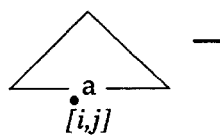
FIG. 36 is a diagrammatic illustration of the terminal matching steps in the parsing unit of the subject invention.
Figure 36:
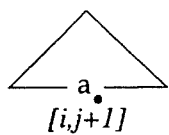
Figure 36:
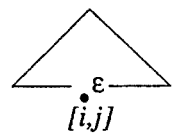
Figure 36:
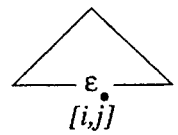

The scanning rules recognize the coverage of nodes and move from position lb to rb. As depicted in FIG. 36, the first two rules 8 and 9 match terminal nodes against elements of the input string.

Rule 10 encodes the fact that one can move directly from the position lb a foot to rb the foot, since by the definition of cover, the foot of an auxiliary tree never covers anything.

Figure 37:
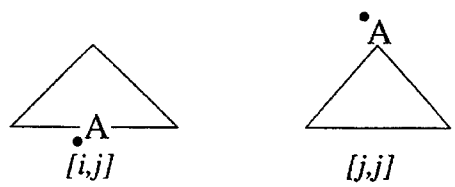
FIG. 37 is a diagrammatic illustration of the substitution prediction step in the parsing unit of the subject invention.

The substitution rules recognize substitution and also move from position lb to rb. As depicted in FIG. 37, the substitution prediction rule 11 predicts in a top-down fashion initial trees to be substituted. It predicts a substitution only if an appropriate left context has been scanned.

Figure 38:
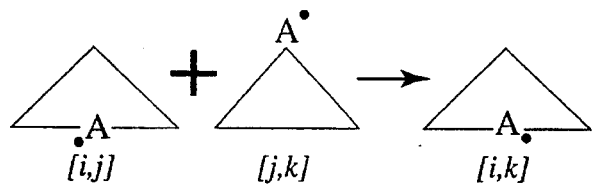
FIG. 38 is a diagrammatic illustration of the substitution completion step in the parsing unit of the subject invention.

As depicted in FIG. 38, the substitution completion rule 12 recognizes a completed substitution. It is a bottom-up step that concatenates the boundaries of a fully recognized initial tree with a partially recognized tree.

Figure 39:
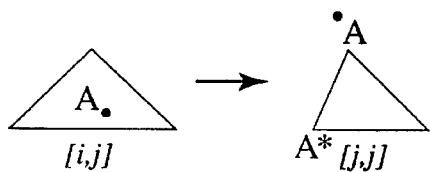
FIG. 39 is a diagrammatic illustration of the right adjunction prediction step in the parsing unit of the subject invention.
Figure 40:
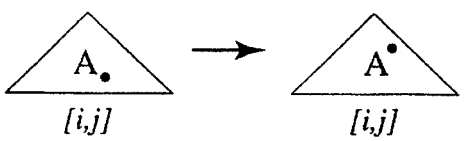
FIG. 40 is a diagrammatic illustration of the right adjunction skipping step in the parsing unit of the subject invention; and, FIG. 41 is a diagrammatic illustration of the right adjunction completion step in the parsing unit of the subject invention.
Figure 41:
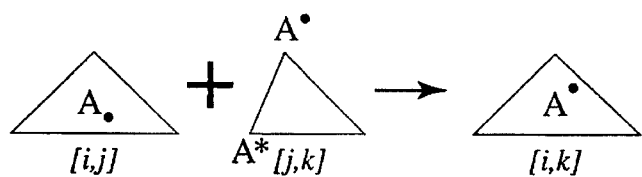

The right adjunction rules are analogous to the left adjunction rules. They recognize right adjunction and move from position rb to ra. As depicted in FIG. 39, rule 13 predicts right adjunction. As depicted in FIG. 40, rule 14 considers the possibility of no right adjunction. As depicted in FIG. 41, rule 15 recognizes right adjunction.

The algorithm takes in the worst case $O(n^3)$ time and $O(n^2)$ space. The worst case complexity comes from the left and right completion steps. An intuition of the validity of this result can be obtained by observing that these steps may be applied at most $n^3$ times since there are at most $n^3$ instances of states, corresponding to the possible ranges of the indices i,j,k.

As stated above, the algorithm is merely a recognizer. It can be converted to a parser by keeping track of the reasons why states are added to the chart $\mathcal{C}$. In this regard, it should be noted that the algorithm always looks for left adjunction before looking for right adjunction. This is unavoidable due to the left-to-right nature of the algorithm. However, both orders of doing adjunction can be recovered when retrieving the derivations corresponding to a completed chart.

For the sake of simplicity, it was assumed above that there are no constraints on adjunction. However, the algorithm can easily be extended to handle such constraints.

When implementing the algorithm above, two steps should be taken to improve the efficiency of the result: grammar pruning and equivalent state merging.

The top-down prediction part of the algorithm does not take full advantage of the fact that the grammar is lexicalized. For instance, it creates initial states for every initial tree whose root is labeled S whether or not the anchor of the rule appears in the input. For efficiency sake, as discussed in "Parsing With Lexicalized Tree Adjoining Grammar" Y. Schabes and A. K. Joshi, in "Current Issues in Parsing Technologies" M. Tomita, editor, Kluwer Academic Publishers, 1990, the prediction of an elementary tree at position j, by rules 5, 11, and 13, should be prevented if the anchor of the ruled does not appear in $a_{j+1} \ldots a_n$. A number of the production rules, in particular 2, 3, 4, 9, and 10, merely move from state to state without changing the left context i,j. These rules reflect facts about the grammar and the traversal and do not refer to the input. These rules can be precompiled out of the algorithm by viewing certain states as equivalent. During parsing one then skips directly from the first to the last state in a set of equivalent states without going through the normal rule application process and enters only the last state in the chart.

The tabulation below indicates which states are equivalent. Merging these states eliminates approximately ¾ of the possible states in the chart $C$. Eliminating the rules that are no longer needed eliminates ⅓ of the rules.

| | | |
|---|---|---|
| $[\eta,la,i,j] \equiv [\eta,lb,i,j]$ | by rule (6) if | $\neg \exists \rho \mid Ladjoinable(\rho,\eta)$ |
| $[\eta,lb,i,j] \equiv [\eta,rb,i,j]$ | by rule (9) if | $Label(\eta) = \epsilon$ |
| $[\phi,lb,i,j] \equiv [\phi,rb,i,j]$ | by rule (10) if | $\exists \rho \mid Foot(\rho) = \phi \neq \bot$ |
| $[\eta,lb,i,j] \equiv [\mu,la,i,j]$ | by rule (2) if | $FirstChild(\eta) = \mu \neq \bot$ |
| $[\eta,rb,i,j] \equiv [\eta,ra,i,j]$ | by rule (14) if | $\neg \exists \rho \mid Radjoinable(\rho,\eta)$ |
| $[\eta,ra,i,j] \equiv [\mu,la,i,j]$ | by rule (3) if | $Sibling(\eta) = \mu \neq \bot$ |
| $[\eta,ra,i,j] \equiv [\mu,rb,i,j]$ | by rule (4) if | $Sibling(\eta) = \bot \wedge Parent(\eta) = \mu \neq \bot$ |

Each of the equivalences equates adjacent states. Occasionally, long chains of equivalent states are possible. Of particular interest are the following. If $\rho$ is the root of a right auxiliary tree then $[\rho,la,i,j] \equiv [Foot(\rho),ra,i,j]$. This is true because the foot does not cover anything, and if there is any structure left of the foot, it must all match the empty string and therefore must match against any input. Further, adjunction cannot apply anywhere on or left of the foot.

If $\phi$ is the foot of a left auxiliary tree then $[\phi,la,i,j] \equiv [Root(\phi),ra,i,j]$. This is true because the foot does not cover anything, and if there is any structure right of the foot, it must all match the empty string and therefore must match against any input. Further, adjunction cannot apply anywhere on or right of the foot.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system for parsing sentences, comprising:

means for providing a sentence to be parsed;

means for providing a context-free grammar;

means for converting said context-free grammar into a lexicalized context-free grammar, said lexicalized context-free grammar employing adjoining, but only allowing non-wrapping adjoining; and means coupled to said converting means for parsing said sentence in accordance with said lexicalized context-free grammar, said parsing means including means for determining if the sentence is parsable, and if parsable means for producing a corresponding parse tree; and, means coupled to said parsing means for utilizing said parse tree.

2. The system of claim 1, and further including means for indicating when a sentence is ungrammatical and therefore not parsable.

3. The system of claim 1, and further including means for displaying said parse trees.

4. The system of claim 1, wherein said converting means includes means for developing a graph representing the interaction of the rules of said context-free grammar, said graph including acyclic and cyclic paths, with at least one of said cyclic paths being a minimal cyclic path;

means for creating an initial tree from each acyclic path in said graph; and, means for creating a non-wrapping auxiliary tree from each minimal cyclic path in said graph, said initial and auxiliary trees forming said lexicalized context-free grammar.

5. The system of claim 1, wherein said parsing means includes means for analyzing said sentence by selecting for consideration during the parsing process only adjacent groups of words, thereby to achieve $k*n^3$ parsing time, where k is a constant and n is the number of words in said sentence.

6. The system of claim 5, wherein said parsing means further includes means for dynamic filtering of said lexicalized context-free grammar to select for parsing only those rules that contain a word in said sentence.

7. The system of claim 5, wherein said parsing means further includes means for maintaining the valid prefix property during parsing.

\* \* \* \* \*